(12) United States Patent
Kim

(10) Patent No.: US 10,698,468 B2
(45) Date of Patent: Jun. 30, 2020

(54) DEVICE AND METHOD FOR CHANGING SETTING VALUE OF ELECTRIC POWER EQUIPMENT

(71) Applicant: LSIS CO., LTD., Anyang-si, Gyeonggi-do (KR)

(72) Inventor: Ju-Hyun Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 189 days.

(21) Appl. No.: 16/032,510

(22) Filed: Jul. 11, 2018

(65) Prior Publication Data

US 2019/0064908 A1 Feb. 28, 2019

(30) Foreign Application Priority Data

Aug. 30, 2017 (KR) .......................... 10-2017-0109860
Aug. 30, 2017 (KR) .......................... 10-2017-0109861

(51) Int. Cl.
*G06F 1/32* (2019.01)
*G06F 1/3203* (2019.01)
(Continued)

(52) U.S. Cl.
CPC ....... *G06F 1/3203* (2013.01); *G05B 19/0426* (2013.01); *G06F 3/0416* (2013.01);
(Continued)

(58) Field of Classification Search
CPC .. G06F 1/3203; G06F 3/0416; G06F 3/04817; G06F 13/4286; G06F 2213/0002;
(Continued)

(56) References Cited

U.S. PATENT DOCUMENTS 5,367,695 A * 11/1994 Narad ................. G06F 13/4027
370/402
6,011,921 A * 1/2000 Takahashi ............... G06F 13/24
709/202

(Continued)

FOREIGN PATENT DOCUMENTS

JP H0667923 A 3/1994
JP 2002140311 A 5/2002
(Continued)

OTHER PUBLICATIONS

Korean Office Action for related Korean Application No. 10-2017-0109861; action dated Aug. 22, 2018; (8 pages).

(Continued)

*Primary Examiner* — Volvick Derose
(74) *Attorney, Agent, or Firm* — K&L Gates LLP

(57) ABSTRACT

Disclosed herein are a device and a method for changing a setting value of electric power equipment. The method for changing a setting value of electric power equipment, includes transmitting a data request signal including a predetermined communication address and receiving a response signal corresponding to the data request signal from a slave communication module corresponding to the communication address using the serial communication network, determining whether communication between the master communication module and the slave communication module is established normally on the basis of the data request signal and the response signal, receiving, from the response signal, model information of a slave communication module in which a setting value change event occurs among slave communication modules of which communications are established normally, and discriminating and displaying, among the slave communication modules of (Continued)

which the communications are established normally, a slave communication module.

19 Claims, 19 Drawing Sheets

(51) Int. Cl.
*G06F 3/0481* (2013.01)
*G06F 3/041* (2006.01)
*G05B 19/042* (2006.01)
*H04L 29/08* (2006.01)
*G06F 13/42* (2006.01)
*G06F 1/26* (2006.01)

(52) U.S. Cl.
CPC .. *G06F 3/04817* (2013.01); *G05B 2219/2231* (2013.01); *G06F 1/26* (2013.01); *G06F 13/4286* (2013.01); *G06F 2213/0002* (2013.01); *H04L 67/12* (2013.01)

(58) Field of Classification Search
CPC ............... G06F 13/4282; G06F 13/385; G05B 19/0426; G05B 2219/2231; H04L 67/12
USPC ........................................................ 713/300
See application file for complete search history.

(56) References Cited

U.S. PATENT DOCUMENTS

| | | | | |
|---|---|---|---|---|
| 2002/0049822 A1* | 4/2002 | Burkhardt | ............... | G06F 15/17 709/208 |
| 2005/0138252 A1* | 6/2005 | Gwilt | ...................... | G06F 13/36 710/110 |
| 2006/0109349 A1* | 5/2006 | Takashima | ............ | G06F 13/385 348/207.1 |
| 2006/0156115 A1* | 7/2006 | Kim | ........................ | H04L 41/06 714/724 |
| 2008/0201511 A1* | 8/2008 | Deshpande | ......... | G06F 13/4291 710/110 |
| 2009/0261969 A1* | 10/2009 | Kobayashi | ............ | B60R 25/102 340/539.11 |
| 2010/0299421 A1* | 11/2010 | Gurdan | ................ | G10H 1/0066 709/222 |
| 2011/0289176 A1* | 11/2011 | Toyama | ............ | H04L 12/40006 709/211 |
| 2012/0102248 A1* | 4/2012 | Tailliet | ................ | G06F 13/4295 710/110 |
| 2012/0191889 A1* | 7/2012 | Fischer | ............... | G06F 13/4291 710/110 |
| 2014/0380234 A1* | 12/2014 | Shim | ..................... | H04L 67/125 715/781 |
| 2016/0292104 A1* | 10/2016 | Mizumoto | ............ | G06F 13/362 |

FOREIGN PATENT DOCUMENTS

| | | |
|---|---|---|
| JP | 2003009432 A | 1/2003 |
| JP | 2008525878 A | 7/2008 |
| JP | 2009109646 A | 5/2009 |
| JP | 2011139554 A | 7/2011 |
| JP | 2013110753 A | 6/2013 |
| JP | 2016111672 A | 6/2016 |
| KR | 100736089 B1 | 7/2007 |
| KR | 1020090046225 A | 5/2009 |
| KR | 101400329 B1 | 5/2014 |
| KR | 101721879 B1 | 3/2017 |

OTHER PUBLICATIONS

Korean Office Action for related Korean Application No. 10-2017-0109860 action dated Aug. 16 2018; (6 pages).
Korean Notice of Allowance for related Korean Application No. 10-2017-0109860; action dated Feb. 10, 2019; (5 pages).

* cited by examiner

DEVICE AND METHOD FOR CHANGING SETTING VALUE OF ELECTRIC POWER EQUIPMENT

CROSS-REFERENCE TO RELATED APPLICATION

Pursuant to 35 U.S.C. § 119(a), this application claims the benefit of earlier filing date and right of priority to Korean Application No. 10-2017-0109860 and Korean Patent Application No. 10-2017-0109861, filed on Aug. 30, 2017, the disclosure of which is incorporated herein by reference in its entirety.

BACKGROUND

1. Field of the Invention

The present invention relates to a device and a method for changing a setting value of electric power equipment.

2. Discussion of Related Art

Recently, a plurality of electric power equipment are monitored in real time using a data transmission method using a Modbus remote terminal unit (RTU) communication protocol based on an RS-485 communication standard in an industrial field.

Serial communication using an RS-485-based Modbus RTU communication protocol includes communication between master and slave communication modules, and 247 slave communication modules can be connected in the serial communication. In this case, communication addresses of the serial communication may be set to addresses of 1 to 247 for the slave communication modules.

In the Modbus serial communication, the master communication module receives response signals from the slave communication modules in response to request signals, which are sequentially transmitted according to the communication addresses, through data polling.

FIG. 1 is a diagram for describing a conventional method for changing a setting value of electric power equipment.

Referring to FIG. 1, a personal computer (PC) Manager 10 is connected to communicate with a plurality of human machine interfaces (HMIs) 20, 20_1, . . . , and 20_n, and the HMI 20 is connected to communicate with a plurality of electric power equipment 30, 30_1, 30_2, . . . , and 30_n. In this case, the communication between the HMI 20 and the plurality of electric power equipment 30, 30_1, 30_2, . . . , and 30_n includes serial communication using the RS-485-based Modbus RTU protocol.

In this case, the PC Manager 10 may include a device or a program capable of monitoring or controlling a plurality of electric power equipment through a plurality of HMIs. Further, the HMI 20 may include a display and a device or a program capable of monitoring or controlling a plurality of electric power equipment. The electric power equipment 30 may include an electronic motor protection relay (EMPR).

Further, the HMI 20 or the PC Manager 10 may include a master communication module, and the electric power equipment 30 may include a slave communication module.

In the serial communication between the HMI 20 and the plurality of electric power equipment 30, 30_1, 30_2, . . . , and 30_n, communication addresses of the plurality of electric power equipment 30, 30_1, 30_2, . . . , and 30_n may be set to communication addresses in the ranged area 1 to 247 by a user.

For example, in an industrial field, the electric power equipment 30 may include a plurality of setting values or measured values for controlling or measuring an operation of the motor.

When the plurality of electric power equipment 30, 30_1, 30_2, . . . , and 30_n, which manage the same motor in the same power system, are installed at a motor control center (MCC), it is cumbersome to individually input 100 of the same setting values at maximum to the plurality of electric power equipment 30, 30_1, 30_2, . . . , and 30_n.

The electric power equipment 30 may have different setting items or different setting values according to model information (e.g., the model information includes a type name, and the type name is unique identification information for electric power equipment). In this case, when the user sets or changes setting items or setting values for the plurality of electric power equipment 30, 30_1, 30_2, . . . , and 30_n, there is a problem in that it is difficult to distinguish electric power equipment having the same model information.

Meanwhile, in order to establish communication of a plurality of electric power equipment to communication of a master communication module in the Modbus serial communication, it is cumbersome for the user to individually input communication addresses to the plurality of electric power equipment.

SUMMARY OF THE INVENTION

The present invention is directed to a method for changing a setting value of electric power equipment which is capable of easily discriminating between electric power equipment having the same model information or the same setting value to select electric power equipment of which a setting value will be changed.

Further, the present invention is directed to a method for changing a setting value of electric power equipment which is capable of easily and collectively changing setting values of a plurality of electric power equipment in a master communication module which manages the plurality of electric power equipment.

Furthermore, the present invention is directed to a method for changing a setting value of electric power equipment, which is capable of easily displaying electric power equipment having the same model information as that of other electric power equipment of which a setting value will be changed so as to allow the electric power equipment to be discriminated from the other electric power equipment.

Moreover, the present invention is directed to a method for changing a setting value of electric power equipment, which is capable of automatically establishing communication of electric power equipment even when a user does not directly input a communication address.

Objectives of the present invention are not limited to the above-described objectives, and other objectives and advantages of the present invention, which are not mentioned, can be understood through the following description and also will be apparently understood through embodiments of the present invention. It is also to be easily understood that the objectives and advantages of the present invention may be realized and attained by means and a combination thereof described in the appended claims.

According to an aspect of the present invention, there is provided a method for changing a setting value of electric power equipment, which is performed in a master communication module connected to a plurality of slave communication modules through a serial communication network, the method including transmitting a data request signal including a predetermined communication address and receiving a response signal corresponding to the data request signal from a slave communication module corresponding to the communication address using the serial communication network, determining whether communication between the master communication module and the slave communication module is established normally on the basis of the data request signal and the response signal, receiving, from the response signal, model information of a slave communication module in which a setting value change event occurs among slave communication modules of which communications are established normally, and discriminating and displaying, among the slave communication modules of which communications are established normally, a slave communication module having the same model information as the model information of the slave communication module in which the setting value change event occurs from a slave communication module having model information different from the model information.

The discriminating and displaying of the slave communication module may include discriminating and displaying an icon corresponding to the slave communication module having the same model information as the model information of the slave communication module in which the setting value change event occurs from an icon corresponding to a slave communication module having model information different from the model information of the slave communication module in which the setting value change event occurs.

The method may further include activating, when an activation condition in which a setting value is variable is satisfied, the icon corresponding to the slave communication module having the same model information as the model information of the slave communication module in which the setting value change event occurs so as to allow icon selection.

The activation condition may include a change of the setting value of the slave communication module in which the setting value change event occurs.

The activation condition may include selection by a user of an icon corresponding to the slave communication module in which the setting value change event occurs for a predetermined period of time.

The discriminating and displaying of the slave communication module may include discriminating and displaying a first icon selected by a user among icons corresponding to slave communication modules having the same model information as the model information of the slave communication module in which the setting value change event occurs from a second icon different from the first icon.

The method may further include changing the setting value of the slave communication module having the same model information as the model information of the slave communication module in which the setting value change event occurs to be the same as the setting value of the slave communication module in which the setting value changing event occurs.

The changing of the setting value of the slave communication module having the same model information as the model information of the slave communication module in which the setting value change event occurs to be the same as the setting value of the slave communication module in which the setting value changing event occurs may include changing a setting value of a slave communication module corresponding to the icon selected by the user from among the icons corresponding to the slave communication modules, which have the same model information as the model information of the slave communication module in which the value change event occurs, to be the same as the setting value of the slave communication module in which the setting value changing event occurs.

The determining of whether the communication is established normally may include receiving model information and a setting value of the slave communication module in which the communication is established normally.

According to another aspect of the present invention, there is provided a method for changing a setting value of electric power equipment, which is performed in a master communication module connected to a plurality of slave communication modules through a serial communication network, the method including transmitting a data request signal including a predetermined communication address and receiving a response signal corresponding to the data request signal from a slave communication module corresponding to the communication address using the serial communication network, determining whether communication between the master communication module and the slave communication module is connected normally on the basis of the data request signal and the response signal, receiving model information and a setting value of a slave communication module in which a setting value change event occurs among one or more slave communication modules of which communications are established normally, and discriminating and displaying the slave communication module in which the setting value change event occurs among the one or more slave communication modules from other communication modules on the basis of the model information and the setting value.

The discriminating and displaying of the slave communication module in which the setting value change event occurs from other communication modules may include distinguishing a slave communication module having the same model information as the model information of the slave communication module in which the setting value change event occurs among the one or more slave communication modules from the other slave communication modules.

The discriminating and displaying of the slave communication module in which the setting value change event occurs from other communication modules may include distinguishing a slave communication module, which has a setting value the same as the setting value of the slave communication module in which the setting value change event occurs, from other slave communication modules among slave communication modules having the same model information as the model information of the slave communication module in which the setting value change event occurs.

The method may further include changing the setting value of the slave communication module, which is the same as the setting value of the slave communication module in which the setting value change event occurs, to a setting value input by the user.

The discriminating and displaying of the slave communication module in which the setting value change event occurs from other communication modules may include distinguishing a slave communication module, which has a setting value different from the setting value of the slave communication module in which the setting value change event occurs, from other slave communication modules among slave communication modules having model information the same as the model information of the slave communication module in which the setting value change event occurs.

The discriminating and displaying of the slave communication module in which the setting value change event occurs from the other communication modules may include grouping and displaying slave communication modules, which have the same setting value among the slave communication modules having setting values different from the setting value of the slave communication module in which the setting value change event occurs.

The method may further include changing the setting value of the slave communication module, which has the setting value different from the setting value of the slave communication module in which the setting value change event occurs, to be the same as the setting value of the slave communication module in which the setting value changing event occurs.

According to still another aspect of the present invention, there is provided a device for changing a setting value of electric power equipment, the device including a plurality of slave communication modules interconnected by a serial communication network, and a master communication module configured to exchange data with the plurality of slave communication modules through the serial communication network, wherein the master communication module includes a communication part configured to, using the serial communication network, transmit a data request signal including a predetermined communication address and receive a response signal corresponding to the data request signal from a slave communication module corresponding to the communication address; a controller configured to determine whether communication between the master communication module and the plurality of slave communication modules is established normally on the basis of the data request signal and the response signal, and extract, from the response signal, model information of a slave communication module in which a setting value change event occurs among the slave communication modules of which the communications are established normally; and a display for discriminating ang displaying, among the slave communication modules of which the communications are established normally, a slave communication module having model information the same as the model information of the slave communication module in which the setting value change event occurs from a slave communication module having model information different from the model information.

The display may discriminate and display an icon corresponding to the slave communication module having the same model information as the model information of the slave communication module in which the setting value change event occurs from an icon corresponding to a slave communication module, which has model information different from the model information of the slave communication module in which the setting value change event occurs. In accordance with the present invention, a plurality of electric power equipment having the same type name or the same setting value are displayed to be easily identified so as to allow electric power equipment of which a setting value will be changed to be selectable, and thus there is an advantage in that convenience in change of the setting value can be improved.

Further, in accordance with the present invention, setting values of a plurality of electric power equipment are easily and collectively changed in the master communication module configured to manage the plurality of electric power equipment, and thus there is an advantage in that a time required for changing the setting values can be reduced and work efficiency of an industrial field can be improved.

Furthermore, in accordance with the present invention, electric power equipment having the same type name as that of target electric power equipment of which a setting value will be changed is discriminated and displayed from other electric power equipment, and thus there is an advantage in that user convenience can be improved.

In addition, in accordance with the present invention, communication of the electric power equipment is automatically established without direct input of a communication address by the user, and thus there is an advantage in that time and costs can be saved.

In addition to the above-described effects, specific effects of the present invention will be described together with the following detailed description for implementing the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
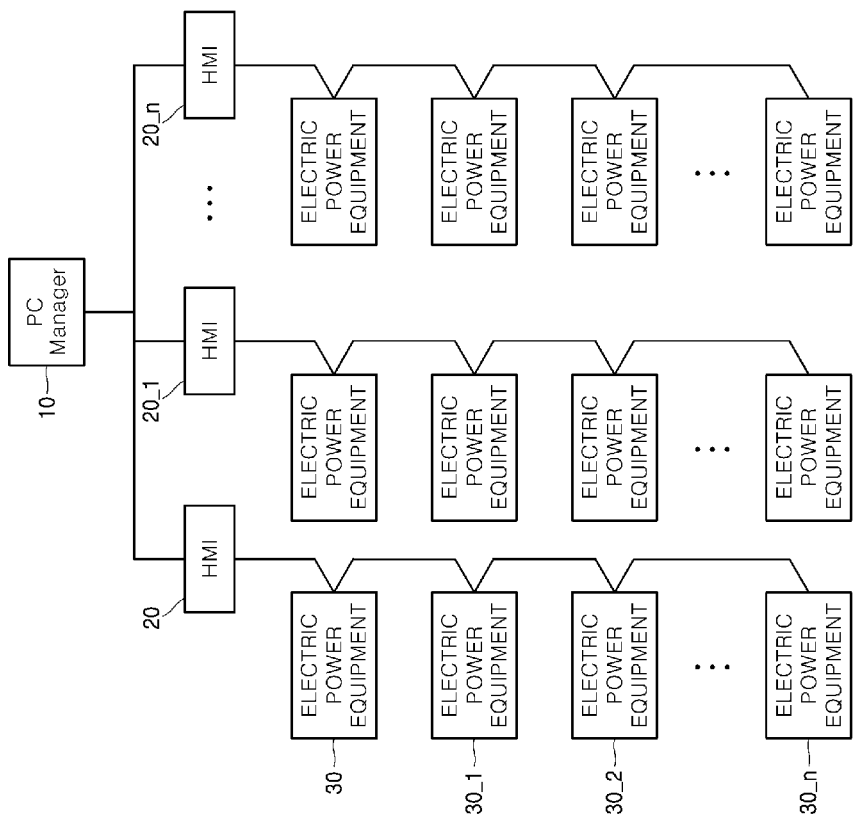
FIG. 1 is a diagram for describing a conventional method for changing a setting value of electric power equipment.

Advantages, features, and implementations of the present invention will be apparent from embodiments which are described in detail below together with the accompanying drawings. The present invention may, however, be implemented in many different forms and should not be construed as being limited to the embodiments set forth herein. The embodiments are provided such that this disclosure will be thorough and complete and will fully convey the scope of the present invention to those skilled in the art to which the present invention pertains, and the present invention is defined only by the scope of the appended claims. Like reference numerals refer to like components throughout the disclosure.

Although the terms first, second, and the like are used to describe various components, these components are substantially not limited by these terms. These terms are used only to distinguish one component from another component. Therefore, a first component described below may substantially be a second component within the technical spirit of the present invention.

Unless defined otherwise, all terms (including technical and scientific terms) used herein may be used in a sense commonly understood by those skilled in the art to which the present invention pertains. Further, terms which are defined in a commonly used dictionary are not to be ideally or excessively interpreted unless explicitly defined otherwise.

Hereinafter, a method for changing a setting value of electric power equipment according to some embodiments of the present invention will be described with reference to FIGS. 2 to 13.

Figure 2:
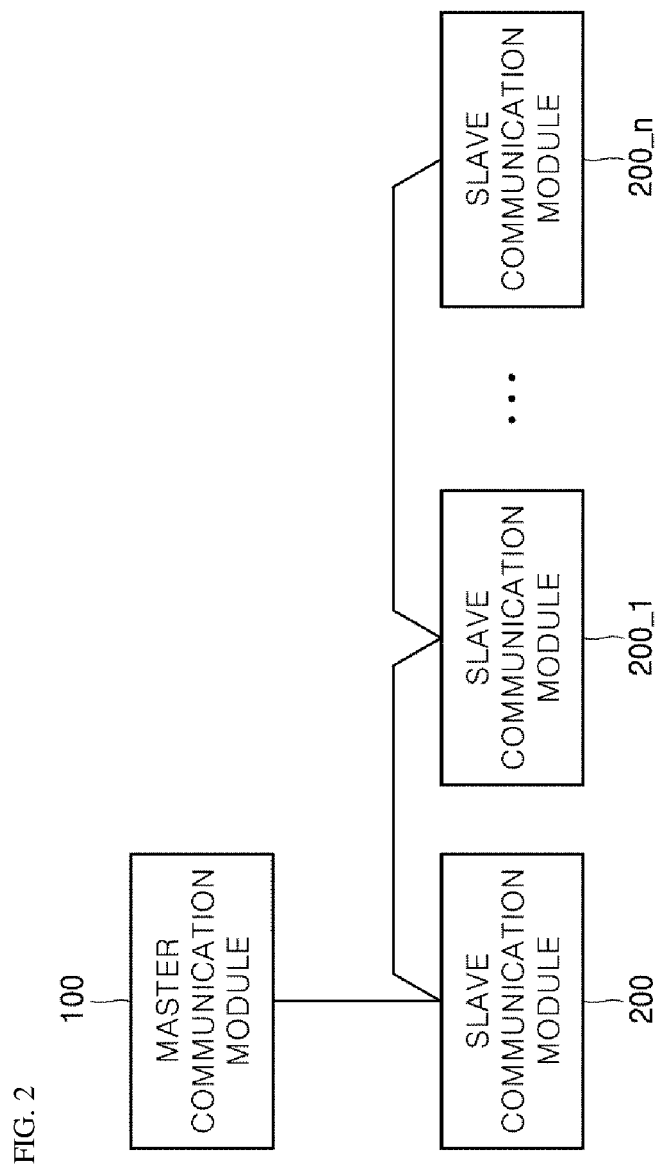
FIG. 2 is a diagram for describing a device for changing a setting value of electric power equipment according to one embodiment of the present invention.

FIG. 2 is a diagram for describing a device for changing a setting value of electric power equipment according to one embodiment of the present invention.

Referring to FIG. 2, the device for changing a setting value of electric power equipment according to one embodiment of the present invention may include a master communication module 100 and a slave communication module 200.

The master communication module 100 includes a module, a device, or a program for performing serial communication using a Recommended Standard 485 (RS-485)-based Modbus remote terminal unit (RTU) communication protocol.

The master communication module 100 may include an electronic device configured to set or change setting values of a plurality of electric power equipment or monitor the plurality of electric power equipment.

For example, the master communication module 100 may be provided as one among various components of an electronic device such as a human communication interface (HMI), a computer, an ultra-mobile personal computer (UMPC), a workstation, a net-book, a personal digital assistant (PDA), a portable computer, a web tablet, a wireless phone, a mobile phone, a smart phone, an e-book, a portable multimedia player (PMP), a portable game machine, a navigation device, a car black box, and a digital camera. However, the present invention is not limited thereto.

The master communication module 100 may exchange data with a plurality of slave communication modules 200, 200_1, . . . , and 200_n using a serial communication network. At this point, a transmission unit of a communication frame exchanged between the master communication module 100 and the slave communication module 200 may be transmitted in a bit unit.

The master communication module 100 may transmit a data request signal to the slave communication module 200 using the serial communication network. At this point, the slave communication module 200 receiving the data request signal may extract the communication address from the data request signal, and only the slave communication module 200 corresponding to the communication address may transmit a response signal to the master communication module 100. However, the present invention is not limited to the described above.

The master communication module 100 may transmit a data request signal including a setting value of electric power equipment to the slave communication module 200. For example, the slave communication module 200 may extract a communication address from the data request signal and transmit a response signal to the master communication module 100. At this point, the master communication module 100 may change the setting value of the electric power equipment including a slave communication module corresponding to the extracted communication address. However, the present invention is not limited to the described above.

The slave communication module 200 includes a module, a device, or a program for performing serial communication using the RS-485-based Modbus RTU communication protocol.

The slave communication module 200 may include an electronic device configured to control or monitor the electric power equipment. For example, the slave communication module 200 may include an electronic motor protection relay (EMPR), an air circuit breaker (ACB), a molded case circuit breaker (MCCB), or a miniature circuit breaker (MCB). However, the present invention is not limited to the described above.

Figure 3:
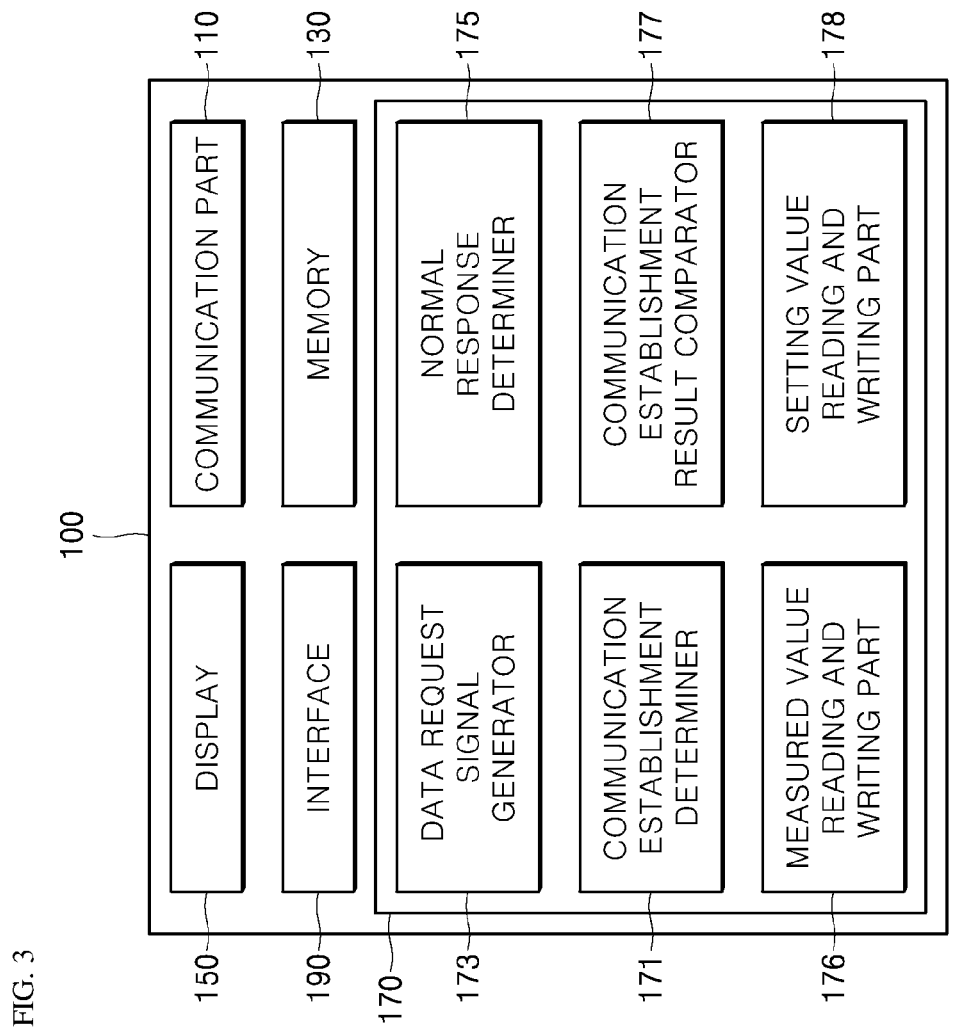
FIG. 3 is a diagram illustrating a detailed configuration of a master communication module included in FIG. 2.

FIG. 3 is a diagram illustrating a detailed configuration of a master communication module included in FIG. 2.

Referring to FIG. 3, the master communication module 100 according to one embodiment of the present invention includes a communication part 110, a memory 130, a display 150, a controller 170, an interface 190, a communication establishment determiner 171, a data request signal generator 173, a normal response determiner 175, a communication establishment result comparator 177, a measured value reading and writing part 176, and a setting value reading and writing part 178. The components of the master communication module 100 shown in FIG. 3 are not essential, so the master communication module 100 having more or fewer components than the shown components may be implemented.

The communication part 110 may include an electronic device, a module, or a program for exchanging data with the slave communication module 200 so as to perform a method for determining a communication establishment according to one embodiment of the present invention. However, the present invention is not limited to the described above.

For example, the communication part 110 may transmit a data request signal including a communication address to at least one slave communication module corresponding to a predetermined communication address and receive a response signal corresponding to the data request signal from the at least one slave communication module using the serial communication network of the Modbus RTU protocol.

The controller 170 may include any type of a conventional processor, a microprocessor, or a processing logic for interpreting and executing commands. The controller 170 may execute commands stored in the memory 130 to display graphical information for a graphical user interface (GUI) on an external input/output device such as a display coupled to a high speed interface.

In another embodiment of the present invention, a plurality of controllers 170 may be used with a plurality of memories 130. In some embodiments, the controller 170 may be modified into a special purpose microprocessor by executing computer-executable commands or by being programmed. Software may be distributed over computer systems connected through a network and be stored or executed in a distributed manner. The software and data may be stored in one or more computer-readable recording media.

The controller 170 may execute an operating system (OS) and one or more software applications running on the operating system. Further, the controller 170 may access, store, manipulate, process, and generate data in response to execution of the software. For ease of understanding, it has been described that a single controller 170 is used in some cases, but those skilled in the art will appreciate that the controller 170 may include a plurality of processing elements and/or a plurality of types of processing elements.

For example, the controller 170 may include a plurality of processors, or a single processor and a single controller. Further, other processing configurations such as a parallel processor are possible. The software may include a computer program, a code, a command, or a combination of one or more thereof, configure the controller 170 to operate as desired, or independently or collectively command the controller 170 to operate as desired.

The software and/or data may be permanently or temporarily embodied in any type of a machine, a component, a physical device, virtual equipment, a computer storage medium or device, or a signal wave which will be transmitted in order to be interpreted by the controller 170 or provide a command or data to the controller 170. The software may be distributed over computer systems connected through a network and stored or executed in a distributed manner. The software and data may be stored in one or more computer-readable recording media.

The method according to the embodiment may be implemented in the form of a program command which is executable through various computer means and be recorded in a computer-readable medium. The computer-readable medium may include program instructions, data files, data structures, and the like alone or in a combination thereof. The program instructions recorded in the computer-readable medium may be specially designed and configured for the embodiment or may be available to those skilled in the computer software. Examples of the program instructions include machine language codes generated by a compiler as well as high-level language codes which are executable by a computer using an interpreter or the like. The above-described hardware devices may be configured to operate as one or more software modules so as to perform an operation of the embodiment and vice versa.

The memory 130 may include a dynamic storage device, such as a random access memory (RAM) or the like, configured to store dynamic information and commands for execution by the controller 170. However, the present invention is not limited to the described above.

Further, the memory 130 may include a static storage device, such as a read only memory (ROM), configured to store static information and commands for use by the controller 170. The memory 130 may be a volatile memory unit or a non-volatile memory unit. Alternatively, the memory 130 may be another type of a computer-readable medium such as a magnetic disk or an optical disk.

The memory 130 may include a computer-readable recording medium for storing one or more programs including commands for causing the controller 170 to perform operations while the method for determining a communication establishment is executed by the controller 170. At this point, the memory 130 may include a communication protocol map of the Modbus RTU communication protocol.

The master communication module 100 or the slave communication module 200 may transmit a communication frame generated on the basis of the communication protocol map. At this point, the communication frame may include a frame of a data request signal or a response signal. For example, the data request signal may include a communication address, a function code, a start address of requested data, or the number of pieces of requested data. Further, the response signal may include a communication address, a function code, a byte count of the response data, or a response data value.

For example, the communication protocol map may include a setting value of the electric power equipment, a measured value thereof, an accident history thereof, or model information thereof.

The display 150 may include at least one among a liquid crystal display (LCD), a thin film transistor (TFT) LCD, an organic light emitting diode (OLED), a flexible display, a three-dimensional display, and an electronic ink (e-ink) display.

The display 150 may include a touch screen panel configured to recognize and transmit an input position to a system when a user makes an input by pressing or touching a screen with a finger or a pen. A method for sensing the input may include a resistive film type, a capacitance type, an infrared ray type, or an optical type.

The display 150 may include a touch pad configured to sense a touch. The display 150 or the touch pad may be configured to sense touch scrolling. However, the present invention is not limited to the described above.

The display 150 may display different communication establishment result messages according to a comparison result in the communication establishment result comparator 177.

When a communication establishment between the master communication module 100 and at least one of the slave communication modules 200, 200_1, . . . , and 200_n is determined as being established abnormally, the display 150 may display a communication establishment result message including an establishment number error message.

The interface 190 may include a module or an electronic device which is configured to receive an input signal from the user. For example, the interface 190 may include a touch pad, a mouse, a keyboard, a camera, or a speaker. In this case, the user may input a gesture or voice by touching or clicking a touch pad, a mouse, or a keyboard, or by using a camera or a speaker. However, the present invention is not limited to the described above.

The interface 190 may receive numbers or characters from the user or may receive selection for an icon displayed on the display 150. However, the present invention is not limited to the described above.

The controller 170 may release the communication establishment between the master communication module 100 and the at least one of the slave communication modules 200, 200_1, . . . , and 200_n according to a communication establishment release command received from the user on the basis of the establishment number error message displayed on the display 150.

For example, the controller 170 may retry the communication establishment between the master communication module 100 and the at least one of the slave communication modules 200, 200_1, . . . , and 200_n via the communication part 110 according to a retry command received from the user on the basis of the establishment number error message.

The user may touch the display 150 or the touch pad to move an object displayed on the display 150, e.g., a cursor or a pointer located in a list. Further, when a finger of the user is moved on the display 150 or the touch pad, a path on which the finger moves may be visually displayed on the display 150. However, the present invention is not limited to the described above.

The controller 170 may include the communication establishment determiner 171, the data request signal generator 173, the normal response determiner 175, the communication establishment result comparator 177, the measured value reading and writing part 176, and the setting value reading and writing part 178. However, the present invention is not limited to the described above.

The data request signal generator 173 may generate a data request signal including a communication address of the slave communication module 200 to which communication will be established on the basis of the communication protocol map stored in the memory 130, a function code (e.g., a function code storing model information of electric power equipment), a data start address (e.g., the start address in which model information of electric power equipment is stored), or the number of requested data (e.g., the number of model information bits of electric power equipment). However, the present invention is not limited to the described above.

The normal response determiner 175 may determine whether a response signal is normal on the basis of the response signal received from the slave communication module 200. For example, when a byte length of a response signal is designated in the master communication module 100 and the byte length exceeds a predetermined byte length, the response signal may be determined as an abnormal response.

For example, when the master communication module 100 receives a response signal corresponding to the data request signal, the response signal may be determined as a normal response. That is, when a type of the response signal matches that of the response signal requested in the data request signal, the response signal may be determined as a normal response. However, the present invention is not limited to the described above.

The communication establishment determiner 171 may determine whether communication between the master communication module 100 and the slave communication module 200 is established normally. For example, when the response signal received from the slave communication module 200 in the master communication module 100 is a normal response, the communication between the master communication module 100 and the slave communication module 200 may be determined as being established normally.

When the response signal received from the slave communication module 200 in the master communication module 100 is the normal response two times in succession, the communication establishment determiner 171 may determine the communication between the master communication module 100 and the slave communication module 200 as being established normally. However, the present invention is not limited thereto.

The communication establishment determiner 171 may determine whether the communication between the master communication module 100 and the slave communication module 200 is established normally on the basis of the data request signal and the response signal.

For example, when the number of the slave communication modules 200, 200_1, . . . , and 200_n (i.e., a first number) connected to communicate with the master communication module 100 is equal to that of communication establishment targets (i.e., a second number) inputted from a user, the communication establishment determiner 171 may determine that the communication establishment between the master communication module 100 and the at least one of the slave communication modules 200, 200_1, . . . , and 200_n is established normally. For example, when the first number is larger or smaller than the second number, the communication establishment determiner 171 may determine that the communication establishment between the master communication module 100 and the at least one of the slave communication modules 200, 200_1, . . . , and 200_n is established abnormally.

The communication establishment result comparator 177 may compare the number of the slave communication modules 200, 200_1, . . . , and 200_n connected to the master communication module 100 with that of the communication establishment target input from the user on the basis of the determination result of the communication establishment determiner 171. However, the present invention is not limited thereto.

The measured value reading and writing part 176 may exchange a measured value of the electric power equipment including the slave communication module 200 with the slave communication module 200 via the communication part 110. For example, the measured value may include a current, a voltage, a load factor, or a distortion factor.

The setting value reading and writing part 178 may exchange the setting value of the electric power equipment including the slave communication module 200 with the slave communication module 200 through the master communication module 100 or the setting value reading and writing part 178 may set a setting value to the electric power equipment including the slave communication module 200. For example, the setting value may include a current setting value, a voltage setting value, or a selective ground setting value. However, the present invention is not limited thereto.

Figure 4:
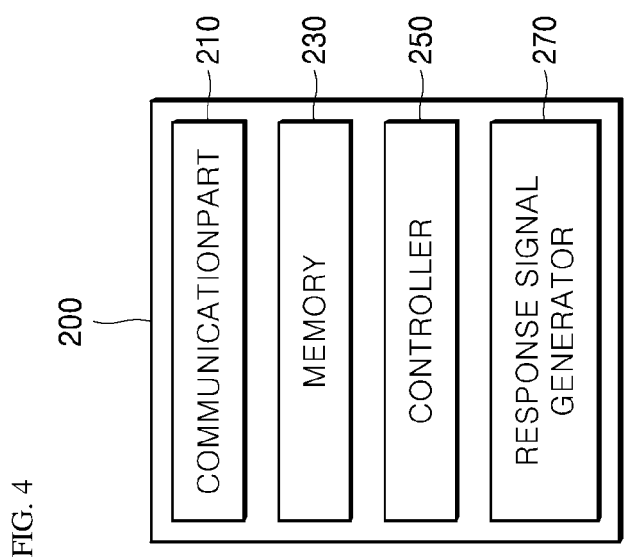
FIG. 4 is a diagram illustrating a detailed configuration of a slave communication module included in FIG. 2.

FIG. 4 is a diagram illustrating a detailed configuration of a slave communication module included in FIG. 2.

Referring to FIG. 4, the slave communication module 200 according to one embodiment of the present invention includes a communication part 210, a memory 230, a controller 250, and a response signal generator 270. The components of the slave communication module 200 shown in FIG. 4 are not essential, so the slave communication module 200 having more or fewer components than the shown components may be implemented.

The communication part 210 may include an electronic device, a module, or a program for exchanging data with the master communication module 100 so as to perform a method for determining a communication establishment according to one embodiment of the present invention. However, the present invention is not limited thereto.

The memory 230 may include a dynamic storage device, such as a RAM or the like, configured to store dynamic information and commands for execution by the controller 250. However, the present invention is not limited thereto.

Further, the memory 230 may include a static storage device, such as a ROM, configured to store static information and commands for use by the controller 250. The memory 230 may be a volatile memory unit or a non-volatile memory unit. Alternatively, the memory 230 may be another type of a computer-readable medium such as a magnetic disk or an optical disk. At this point, the memory 230 may include a communication protocol map of the Modbus RTU communication protocol.

The slave communication module 200 may transmit a communication frame generated on the basis of the communication protocol map. At this point, the communication frame may include a frame of a data request signal or a response signal.

For example, the data request signal may include a communication address, a function code, a start address of requested data, or the number of pieces of requested data. Further, the response signal may include a communication address, a function code, a byte count of the response data, or a response data value.

For example, the communication protocol map may include a setting value of the electric power equipment, a measured value thereof, an accident history thereof, or model information thereof.

The controller 250 may include any type of a conventional processor, a microprocessor, or a processing logic for interpreting and executing commands. The controller 250 may execute commands stored in the memory 230 to display graphical information for a GUI on an external input/output device such as a display coupled to a high speed interface.

In another embodiment of the present invention, a plurality of controllers 250 may be used with a plurality of memories 230. In some embodiments, the controller 250 may be modified into a special purpose microprocessor by executing computer-executable commands or by being programmed The software may be distributed over computer systems connected through a network and be stored or executed in a distributed manner. The software and data may be stored in one or more computer-readable recording media.

For ease of understanding, it has been described that a single controller 250 is used in some cases, but those skilled in the art will appreciate that the controller 250 may include a plurality of processing elements and/or a plurality of types of processing elements. For example, the controller 250 may include a plurality of processors, or a single processor and a single controller. Further, other processing configurations such as a parallel processor are possible.

In another embodiment of the present invention, a plurality of controllers 250 may be used with a plurality of memories 230. In some embodiments, the controller 250 may be modified into a special purpose microprocessor by executing computer-executable commands or by being programmed However, the present invention is not limited thereto.

The response signal generator 270 may extract a communication address included in the data request signal received from the master communication module 100 and generate a response signal corresponding to the data request signal when a communication address corresponding to the slave communication module 200 is extracted.

For example, only when the communication address extracted from the data request signal corresponds to "1," the response signal generator 270 of the slave communication module 200 corresponding to the communication address "1" may generate a response signal.

The response signal generator 270 may generate a response signal including a communication address of the slave communication module 200, a function code (e.g., a function code in which model information of the electric power equipment is stored), a byte count (e.g., a byte count of the response signal), or a data value (e.g., model information of the electric power equipment) on the basis of the communication protocol map stored in the memory 230. However, the present invention is not limited to the described above.

Figure 5:
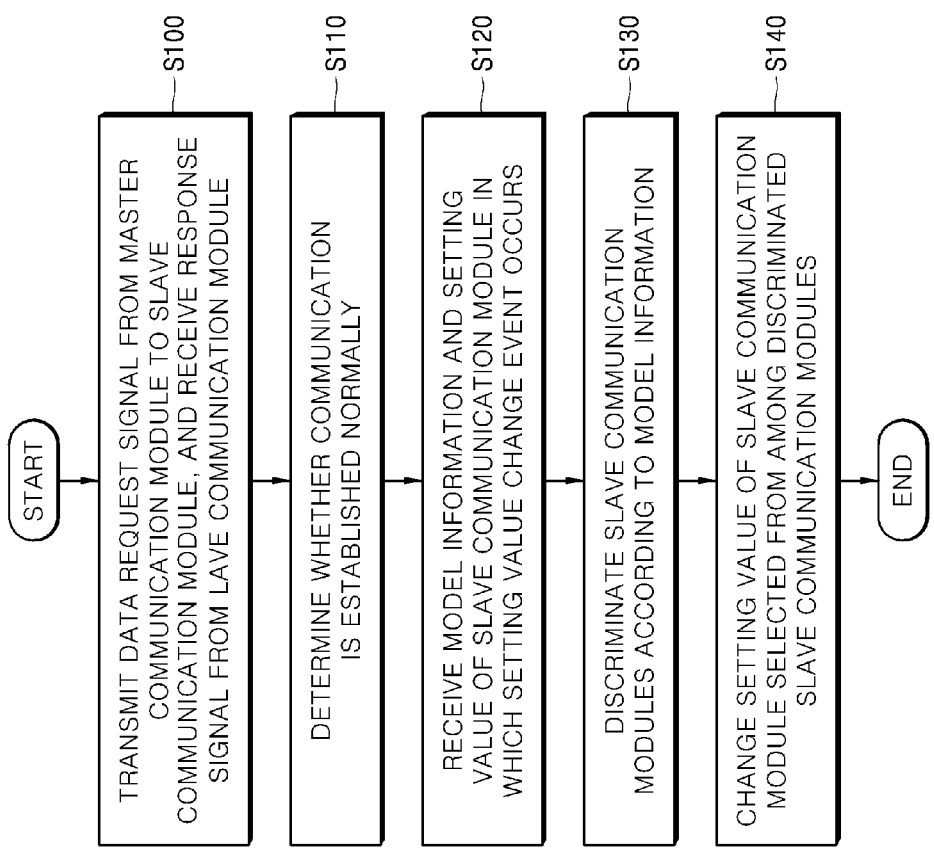
FIG. 5 is a flowchart for describing a method for changing a setting value of electric power equipment according to some embodiments of the present invention.

FIG. 5 is a flowchart for describing a method for changing a setting value of electric power equipment according to some embodiments of the present invention.

Referring to FIG. 5, the master communication module 100 transmits a data request signal including a predetermined communication address to the slave communication module 200 corresponding to the communication address using the serial communication network of the Modbus RTU protocol. Then, the master communication module 100 may receive a response signal corresponding to the data request signal and including model information of the slave communication module 200 from the slave communication module 200 (S100).

Subsequently, the master communication module 100 may determine whether the communication between the master communication module 100 and the slave communication module 200 is established normally on the basis of the data request signal and the response signal (S110). For example, the master communication module 100 may receive the model information and setting value of the slave communication module 200 of which communication is established normally.

Thereafter, the master communication module 100 may receive model information or a setting value of a second slave communication module, in which a setting value change event occurs, among first slave communication modules of which communications are established normally (S120). For example, the master communication module 100 may receive model information or a setting value of a second slave communication module corresponding to an icon, which is selected by the user, among icons corresponding to the first slave communication modules of which communications are established normally, which are indicated on the display.

For example, the setting value change event may occur when the user selects a setting value change menu of the slave communication module 200, of which a setting value will be changed by the user through the display 150 of the master communication module 100, or when the user inputs a changed setting value. A detailed description thereof will be described below with reference to FIG. 11.

Subsequently, the master communication module 100 may discriminate a fourth slave communication module having different model information from a third slave communication module having model information identical to that of the second slave communication module in which the setting value change event occurs among the first slave communication modules of which communications are established normally (S130).

For example, the master communication module 100 may discriminate and display an icon corresponding to the third slave communication module on the display 150 from an icon corresponding to the fourth slave communication module. At this point, the icon corresponding to the third slave communication module may be activated to be selectable when an activation condition in which a setting value change is available is satisfied.

For example, the master communication module 100 may display a first icon selected by the user among icons corresponding to the third slave communication modules to distinguish from a second icon different from the first icon among the icons corresponding thereto. However, the present invention is not limited thereto.

According to one embodiment of the present invention, the master communication module 100 may change the setting value of the third slave communication module to be equal to that of the second slave communication module. For example, the master communication module 100 may change the setting value of the third slave communication module corresponding to the icon selected by the user among the icons corresponding to the third slave communication modules to be equal to the setting value of the second slave communication module. However, the present invention is not limited thereto.

Further, the master communication module 100 may change a setting value of the slave communication module selected by the user among the discriminated slave communication modules (S140). For example, the master communication module 100 may change the setting value of the third slave communication module to be equal to that of the second slave communication module. At this point, the master communication module 100 may change the setting value of the third slave communication module corresponding to the icon input by the user among the icons corresponding to the third slave communication modules to be equal to the setting value of the second slave communication module. However, the present invention is not limited thereto.

Figure 6:
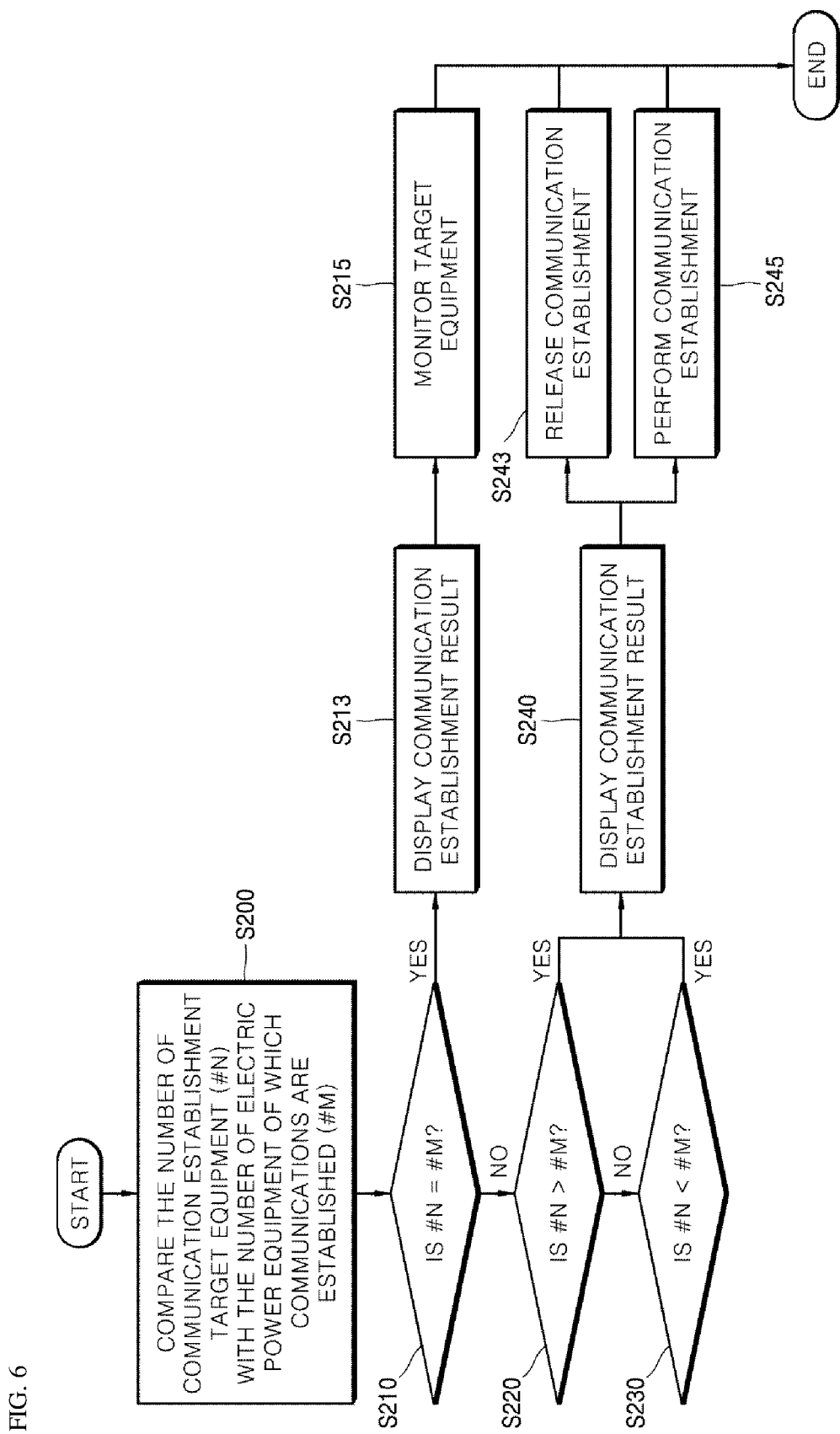
FIG. 6 is a flowchart for describing a method for determining a communication connection according to some embodiments of the present invention.

FIG. 6 is a flowchart for describing a method for determining a communication establishment according to some embodiments of the present invention.

Referring to FIG. 6, the number "N" (herein N is a natural number) of communication establishment target devices is compared with the number "M" (herein M is a natural number) of electric power equipment of which communications are established (S200). For example, the master communication module 100 may compare the number N input from the user with the number M of the electric power equipment of which communications are established as a result of a communication establishment attempt.

Thereafter, when N and M are equal to each other (S210), the master communication module 100 may display a communication establishment result including a normal establishment message which means that communication is established normally (S213).

Then, the master communication module 100 may monitor the electric power equipment of which communications are established (S215). For example, when the number input by the user is equal to the number of electric power equipment of which communications are established, the master communication module 100 may determine that there are no missing or duplicated electric power equipment.

Thereafter, when N is greater than M as the number comparison result (S220), the master communication module 100 may display a communication establishment result including an establishment number error message (S240). Further, when N is smaller than M as the number comparison result (S230), the master communication module 100 may display the communication establishment result including the establishment number error message (S240). For example, the establishment number error message may include an error resolving method. However, the present invention is not limited thereto.

Subsequently, the master communication module 100 may release the communication establishment between the master communication module 100 and the at least one of the slave communication modules 200, 200_1, . . . , and 200_n according to a communication establishment release command received from the user on the basis of the establishment number error message (S243). Alternatively, the master communication module 100 may retry the communication establishment between the master communication module 100 and the at least one slave communication modules 200, 200_1, . . . , and 200_n according to a communication establishment retry command received from the user on the basis of the establishment number error message (S245). However, the present invention is not limited thereto.

Figure 7:
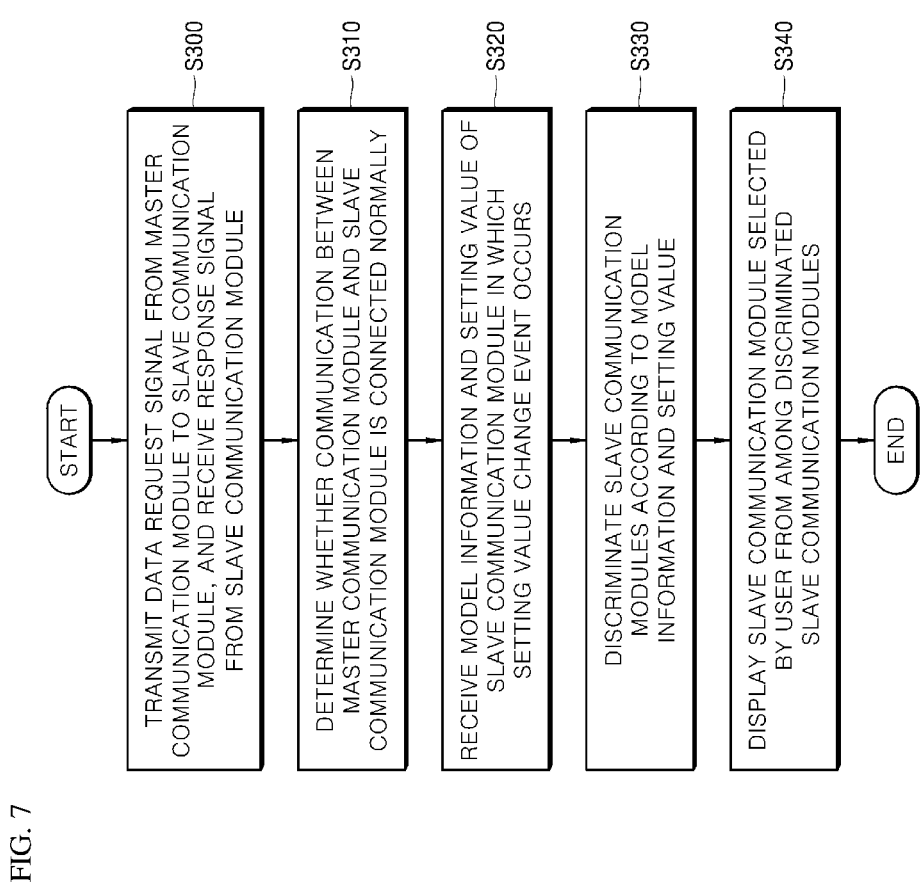
FIG. 7 is a flowchart for describing a method for changing a setting value of electric power equipment according to one embodiment of the present invention.

FIG. 7 is a flowchart for describing a method for changing a setting value of electric power equipment according to one embodiment of the present invention.

Referring to FIG. 7, the master communication module 100 may transmit a data request signal including a predetermined communication address to the slave communication module 200 corresponding to the communication address using the serial communication network of the Modbus RTU protocol and the master communication module 100 may receive a response signal corresponding to the data request signal from the slave communication module 200, which includes the model information of the slave communication module 200 (S300).

Subsequently, the master communication module 100 may determine whether the communication between the master communication module 100 and the slave communication module 200 is established normally on the basis of the data request signal and the response signal (S310). For example, the master communication module 100 may receive the model information and setting value of the slave communication module 200 of which communication is established normally.

Thereafter, the master communication module 100 may receive model information and a setting value of a second slave communication module, in which a setting value change event occurs, among first slave communication modules of which communications are established normally (S320).

For example, the master communication module 100 may receive model information and a setting value of a second slave communication module corresponding to an icon, which is input by the user, among icons corresponding to the first slave communication modules, which are indicated on the display 150, of which communications are established normally.

For example, the setting value change event may occur when the user inputs a setting value change screen of the slave communication module 200, of which a setting value will be changed by the user through the display 150 of the master communication module 100, or when the user inputs a changed setting value.

Subsequently, the master communication module 100 may distinguish the first slave communication module on the basis of the model information and the setting value of the second slave communication module (S330). For example, the master communication module 100 may distinguish the third slave communication module having model information equal to that of the second slave communication module among the slave communication modules from another slave communication module.

Further, the master communication module 100 may distinguish a fourth slave communication module having a setting value equal to that of the second slave communication module among the slave communication modules from another slave communication module.

For example, the master communication module 100 may display icons corresponding to the slave communication modules with different colors on the display 150 to distinguish the slave communication modules from each other. At this point, the master communication module 100 may change the setting value of the fourth slave communication module to be equal to the changed setting value of the second slave communication module, which is received from the user.

For example, the master communication module 100 may distinguish and display a fifth slave communication module having a setting value different from that of the second slave communication module among the slave communication modules from another slave communication module. At this point, the master communication module 100 may group and display the fifth slave communication modules having the same setting value. For example, the master communication module 100 may group and display icons with different colors for a plurality of fifth slave communication modules having the same setting value. Further, the master communication module 100 may change the setting value of the fifth slave communication module to be equal to that of the second slave communication module.

For example, the master communication module 100 may change the setting value of the fifth slave communication module to be equal to the changed setting value of the second slave communication module which is received from the user. However, the present invention is not limited thereto.

Subsequently, the master communication module 100 may display a slave communication module selected by the user from among the discriminated slave communication modules (S340). At this point, the master communication module 100 may change a setting value of the slave communication module selected by the user. However, the present invention is not limited thereto.

According to one embodiment of the present invention, the master communication module 100 may change the setting value of the third slave communication module to be equal to that of the second slave communication module. At this point, the master communication module 100 may change the setting value of the third slave communication module corresponding to the icon input by the user from among the icons corresponding to the third slave communication module to be equal to the setting value of the second slave communication module. However, the present invention is not limited thereto.

Figure 8:
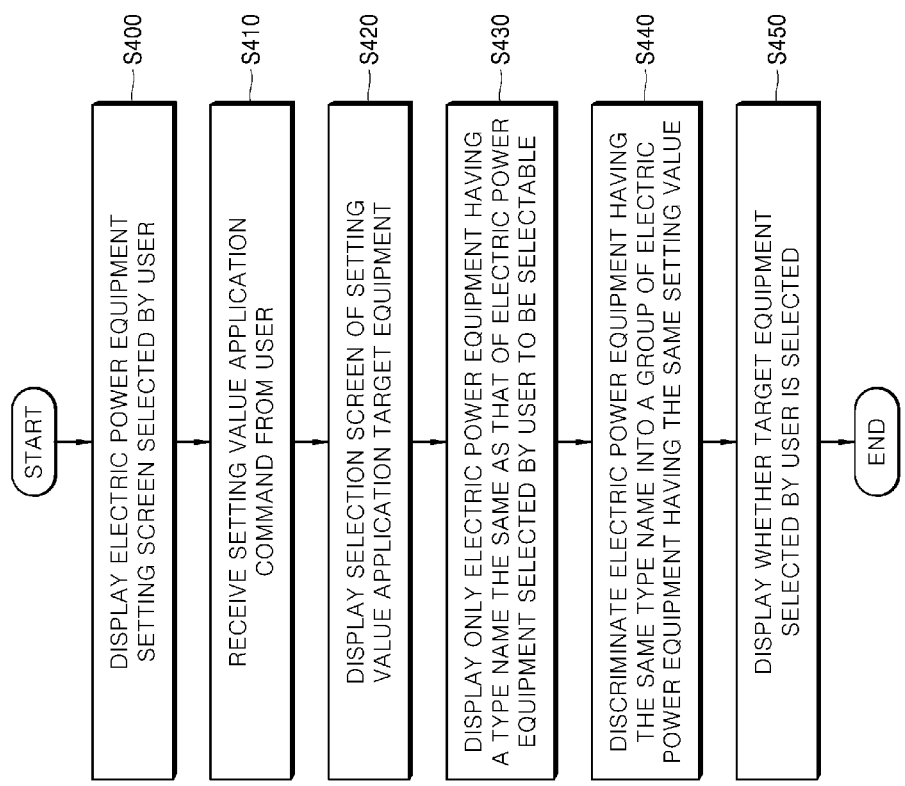
FIG. 8 is a flowchart for describing a method for changing a setting value of electric power equipment according to another embodiment of the present invention.

FIG. 8 is a flowchart for describing a method for changing a setting value of electric power equipment according to another embodiment of the present invention.

Referring to FIG. 8, the master communication module 100 may display a setting screen of an electric power equipment selected by the user on the display 150 (S400). For example, when the user inputs a setting value change menu of the electric power equipment to change the setting value of the electric power equipment, the master communication module 100 may display a setting screen of the electric power equipment selected by the user on the display 150.

Then, the master communication module 100 may receive a setting value application command from the user (S410). For example, when the user completes the setting value change and inputs a setting value application icon, the master communication module 100 may store the setting value in the memory with the changed setting value.

Subsequently, the master communication module 100 may display a setting value application target equipment selection screen (S420). At this point, the master communication module 100 may display only electric power equipment having a type name equal to that of the electric power equipment selected by the user to be selectable (S430). Further, the master communication module 100 may group and display electric power equipment having the same type name as a group of electric power equipment having the same setting value (S440).

Subsequently, the master communication module 100 may display whether the target electric power equipment selected by the user is selected (S450). For example, the master communication module 100 may display icons with different colors or shades so as to allow the selected electric power equipment to be distinguished from another electric power equipment. However, the present invention is not limited thereto.

Figure 9:
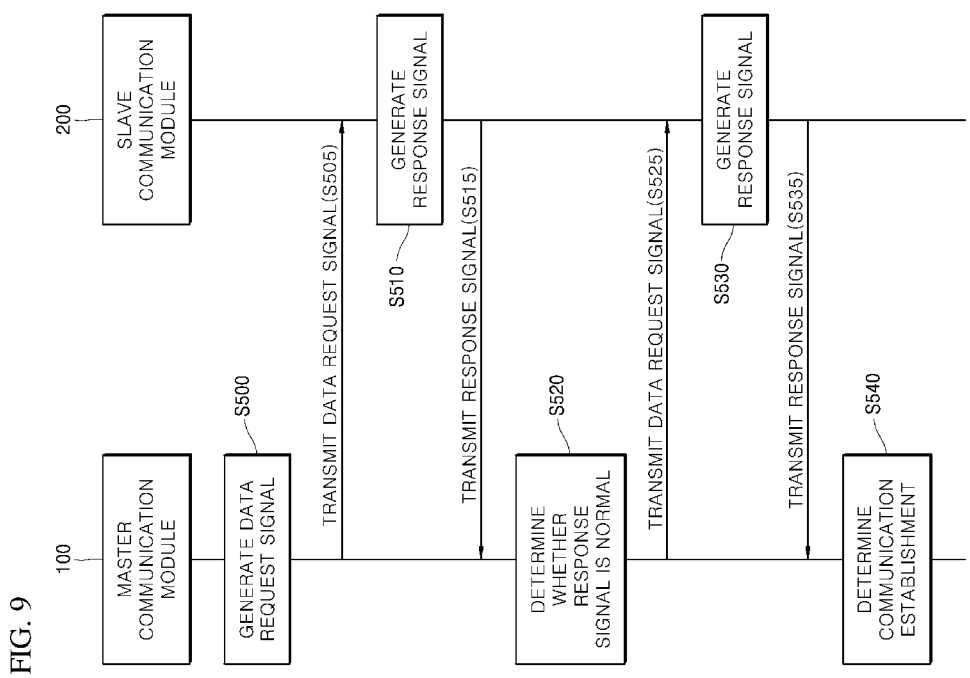
FIG. 9 is a flowchart for describing a method for determining a communication establishment according to one embodiment of the present invention.

FIG. 9 is a flowchart for describing a method for determining a communication establishment according to one embodiment of the present invention.

Referring to FIG. 9, the master communication module 100 generates a data request signal (S500), and the master communication module 100 transmits the data request signal to the slave communication module 200 (S505). For example, the master communication module 100 may generate the data request signal including a predetermined communication address and transmit the data request signal to the slave communication module 200 using the serial communication network of the Modbus RTU protocol.

At this point, the master communication module 100 may transmit the data request signal to one of the slave communication modules 200 corresponding to the communication address, to which communication establishment is desired, among the slave communication modules 200 having communication addresses of 1 to 247.

For example, the master communication module 100 may sequentially transmit the data request signal to the slave communication modules 200 corresponding to the communication addresses of 1 to 247. However, the present invention is not limited thereto.

Then, the slave communication module 200 generates a data response signal (S510), and the slave communication module 200 transmits the data response signal to the master communication module 100 (S515). For example, when the slave communication module 200 receives the data request signal, the slave communication module 200 may extract the communication address from the data request signal.

At this point, when the communication address extracted from the data request signal matches a communication address of the slave communication module 200, the slave communication module 200 may transmit the response signal to the master communication module 100.

Subsequently, the master communication module 100 determines whether the response is normal (S520). For example, the master communication module 100 may determine whether the slave communication module 200 responds normally on the basis of the received response signal.

For example, when a byte length of a response signal is designated in the master communication module 100 and the byte length exceeds a predetermined byte length, the response signal may be determined as an abnormal response. For example, when the master communication module 100 receives a response signal corresponding to the data request signal, the response signal may be determined as a normal response. That is, when a type of the response signal matches that of the response signal requested in the data request signal, the response signal may be determined as a normal response. However, the present invention is not limited thereto.

Subsequently, the master communication module 100 transmits a data request signal to the slave communication module 200 (S525). Then, the slave communication module 200 generates a data response signal (S530), and the slave communication module 200 transmits the data response signal to the master communication module 100 (S535). For example, when the response signal received by the master communication module 100 is determined as being a normal response, the master communication module 100 may re-execute the transmitting of the data request signal and the determining of whether the response is normal.

Subsequently, the master communication module 100 determines whether communication is established (S540). For example, the master communication module 100 may determine whether the communication between the master communication module 100 and the slave communication module 200 is established normally on the basis of determination values for whether the response signal is normal, which are received from the slave communication module 200 two times.

For example, when the response signal received from the slave communication module 200 in the master communication module 100 is determined to be the normal response, the master communication module 100 may determine that the communication between the master communication module 100 and the slave communication module 200 is established normally.

Further, when the response signal received from the slave communication module 200 in the master communication module 100 is the normal response two times in succession, the master communication module 100 may determine the communication between the master communication module 100 and the slave communication module 200 as being established normally. However, the present invention is not limited thereto.

Figure 10:
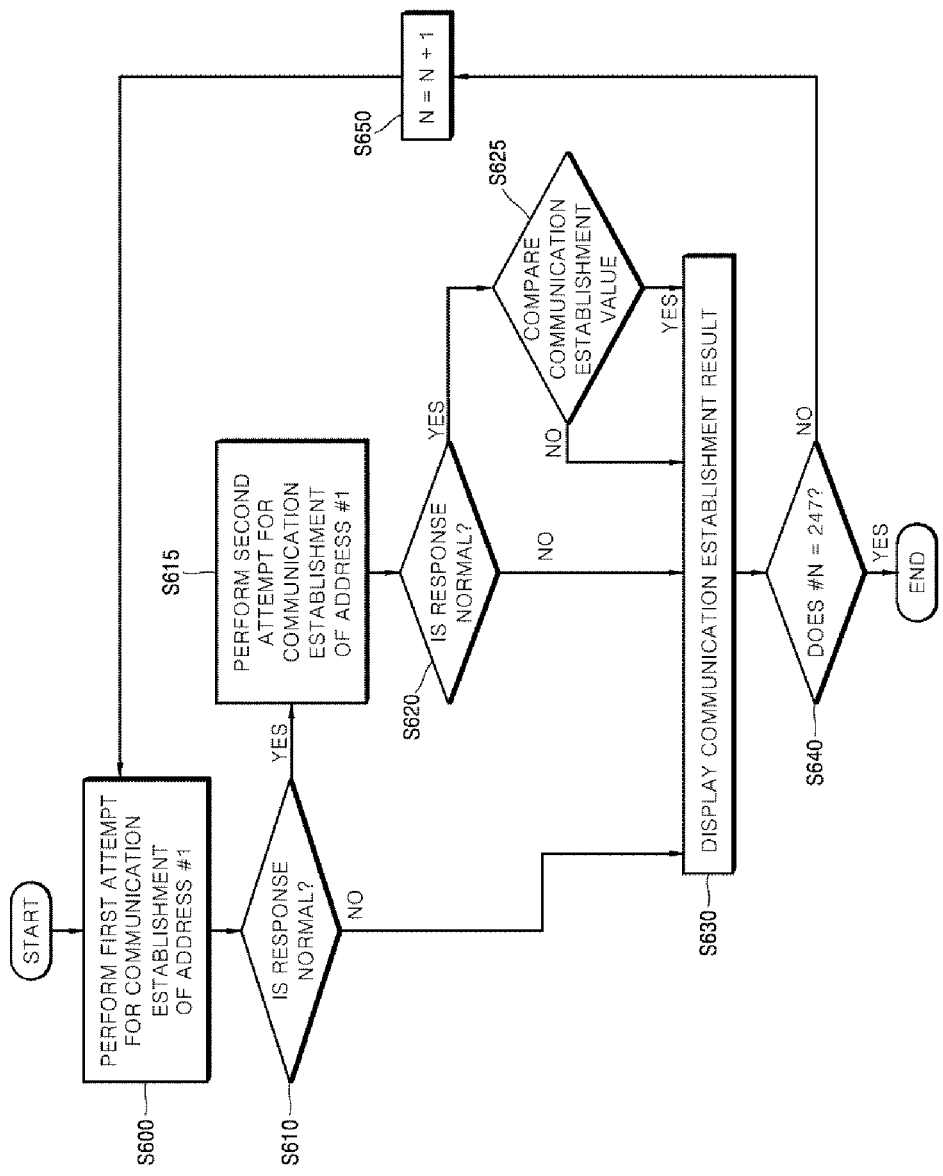
FIG. 10 is a flowchart for describing a method for determining a communication establishment according to another embodiment of the present invention.

FIG. 10 is a flowchart for describing a method for determining a communication establishment according to another embodiment of the present invention.

Referring to FIG. 10, the master communication module 100 attempts a first communication establishment to the slave communication module 200 having a communication address #N (e.g., N is a natural number) (S600).

For example, when the master communication module 100 initially transmits a data request signal including a communication address #3 to the slave communication module 200 having a communication address #3, it may be referred to as a first communication establishment attempt.

Then, the master communication module 100 determines whether the response signal received from the slave communication module 200 having a communication address #N is a normal response (S610).

For example, the master communication module 100 may determine whether the response signal including the communication address #3 corresponding to the data request signal including the communication address #3 is normal.

For example, when a byte length of the response signal received by the master communication module 100 is within the predetermined byte length, the response signal may be determined as being a normal response.

Further, when the master communication module 100 transmits a plurality of data request signals and the slave communication module 200 transmits response signals at an input/output waiting time between data request signal transmission times, the response signals received by the master communication module 100 at the input/output waiting time may be determined as being abnormal responses.

Subsequently, when the response signals received by the master communication module 100 are normal responses, a second communication establishment is attempted with respect to the communication address #N (S615).

For example, if the response signal received in the first communication establishment attempt is a normal response, the master communication module 100 may attempt a secondary communication establishment to the same communication address as the first communication establishment attempt. At this point, the communication establishment attempt may perform as in the first communication establishment attempt.

For example, the first and second communication establishments may include first and second stages or first and second communication establishments.

Then, after the second communication establishment is attempted, the master communication module 100 determines whether the response signal received from the slave communication module 200 having the communication address #N is a normal response (S620). At this point, the determination whether the response signal is the normal response may be the same as the attempt of the first communication establishment. However, the present invention is not limited thereto.

Subsequently, when the response signal with respect to the second communication establishment attempt is determined as being a normal response, the master communication module 100 compares whether the response signals of the first and second communication establishment attempts are equal to each other (S625). For example, when the response signals of the first and second communication establishment attempts are determined as the normal responses, the master communication module 100 may determine the communication between the master communication module 100 and the slave communication module 200 transmitting the response signals as being established normally. Further, when the model information included in the response signals of the first and second communication establishment attempts are equal to each other, the master communication module 100 may determine the communication between the master communication module 100 and the slave communication module 200 transmitting the response signals as being established normally.

In one embodiment of the present invention, when all the response signals in the first and second communication establishment attempts are determined as being the normal responses, the master communication module 100 may determine the communication between the master communication module 100 and the slave communication module 200, which has a communication address and transmits the response signals, as being established normally.

Subsequently, when the response signals are abnormal responses or are not equal to each other in the first and second communication establishment attempts, the master communication module 100 displays a communication establishment failure on the display 150 (S630).

Further, when the response signals of the first and second communication establishment attempts are equal to each other, the master communication module 100 display a communication establishment success message on the display 150 (S630).

Subsequently, the master communication module 100 terminates the communication establishment attempt to the communication address #N and determines whether the communication address #N corresponds to a communication address #247 (S640).

Thereafter, when the communication address #N does not correspond to the communication address #247, the master communication module 100 attempts a communication establishment to a slave communication module 200 having a communication address #N+1 (S650). For example, the master communication module 100 may attempt a communication establishment to a communication address #2 after completing the communication establishment attempts to the communication address #1. However, the present invention is not limited thereto.

Figure 11:
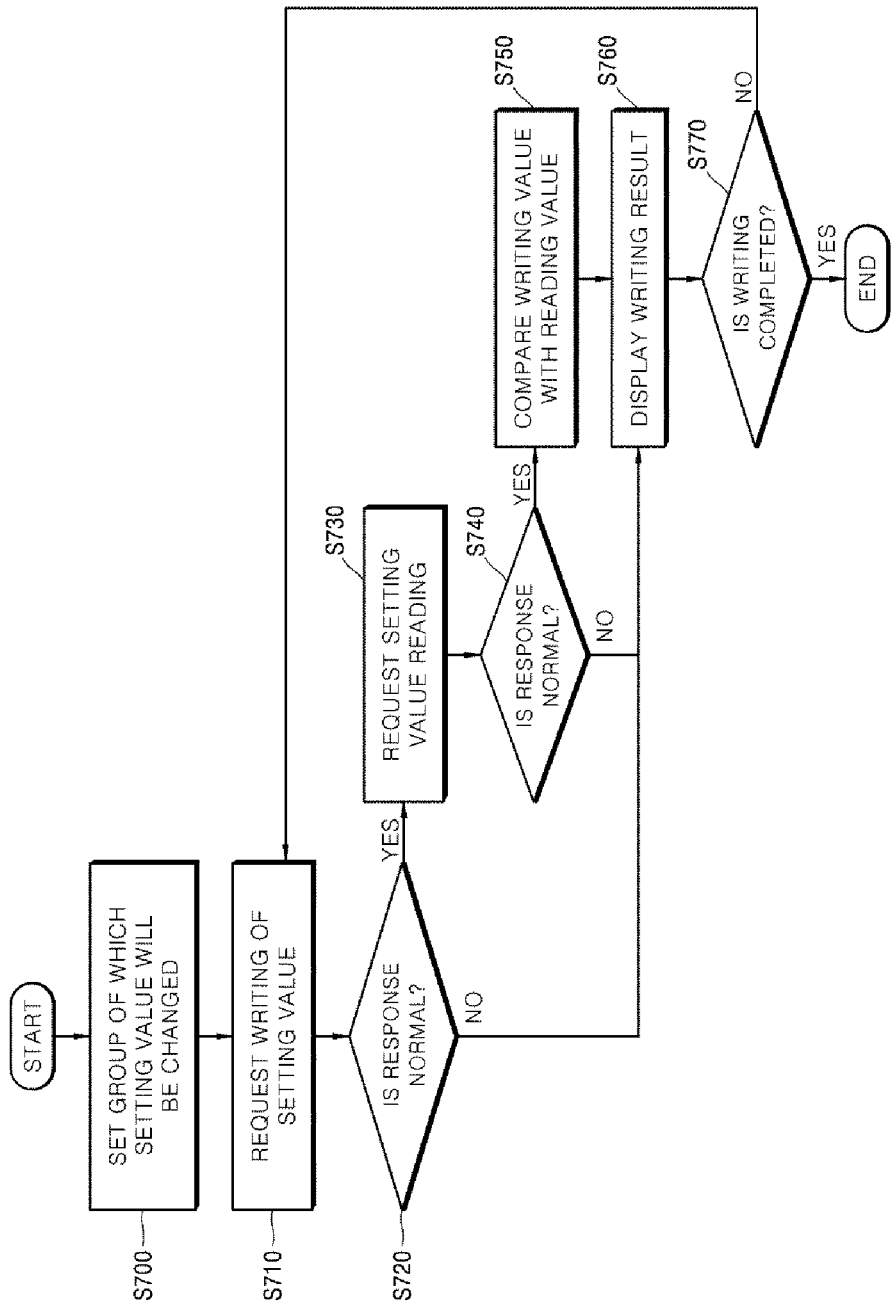
FIG. 11 is a flowchart for describing a method for changing a setting value of electric power equipment according to still another embodiment of the present invention.

FIG. 11 is a flowchart for describing a method for changing a setting value of electric power equipment according to still another embodiment of the present invention.

Referring to FIG. 11, the user may set a group of slave communication modules of which setting values will be changed among the slave communication modules 200, 200_1, . . . , and 200_n discriminated according to the same type name or the same setting value and displayed on the display 150 of the master communication module 100 (S700). For example, a group of slave communication modules of which setting values will be changed may include at least one slave communication module. However, the present invention is not limited thereto.

Then, the user may request a setting value writing to change a setting value with respect to a group of the slave communication modules 200, 200_1, . . . , and 200_n of which setting values are set to be changed (S710).

For example, the user may request a setting value writing with respect to a slave communication module group having the same type name as the slave communication module 200 of which a setting value will be changed by the user to have the same setting value of the slave communication module 200. At this point, the master communication module 100 may transmit a data request signal including a communication address of a slave communication module of which a setting value will be changed by the user, and the setting value to the slave communication module. However, the present invention is not limited thereto.

Subsequently, the master communication module 100 may determine whether a normal response is received on the basis of a response signal received from the slave communication module 200 (S720). For example, the master communication module 100 receives the response signal corresponding to the data request signal including a setting value from the slave communication module and may determine whether the setting value writing has been normally performed through a normal reception of the response signal. At this point, the setting value writing includes changing of the existing setting value to a new setting value.

Thereafter, when a response signal corresponding to the setting value writing is a normal response, the master communication module 100 may request a setting value reading to the slave communication module 200 (S730). For example, the master communication module 100 may transmit a data request signal requesting a current setting value of the slave communication module to the slave communication module and may receive a response signal including the setting value from the slave communication module.

Subsequently, the master communication module 100 may determine whether a normal response is received on the basis of a response signal received from the slave communication module 200 (S740). For example, the master communication module 100 receives the response signal including the setting value from the slave communication module and may determine whether the setting value reading has been normally performed through a normal reception of the response signal. At this point, the setting value reading includes transmission of the current setting value of the slave communication module.

Thereafter, when the response signal corresponding to the setting value reading is a normal response, the master communication module 100 may compare a value of the setting value writing with a value of the setting value reading (S750). For example, the master communication module 100 may compare whether a setting value included in the data request signal requesting the setting value writing and a setting value included in the response signal for the request of the setting value reading are equal to each other. At this point, the determining of whether the setting values are equal to each other may be performed by comparing setting items or setting values. However, the present invention is not limited to the described above.

Subsequently, the master communication module 100 may display whether the setting value writing is successful according to whether the setting values are equal to each other (S760). For example, when the setting value of the setting value writing and the setting value of the setting value reading are equal to each other, the master communication module 100 may display the result in which the setting value writing is successful on the display 150.

Thereafter, the master communication module 100 may determine whether the setting value writing of all of the slave communication modules included in the slave communication module group of which the setting values will be changed is completed (S770). For example, the master communication module 100 may sequentially change the setting values of the slave communication modules according to the communication addresses and may complete the setting value writing when changing the setting value of the slave communication module corresponding to a last communication address. However, the present invention is not limited thereto.

Figure 12:
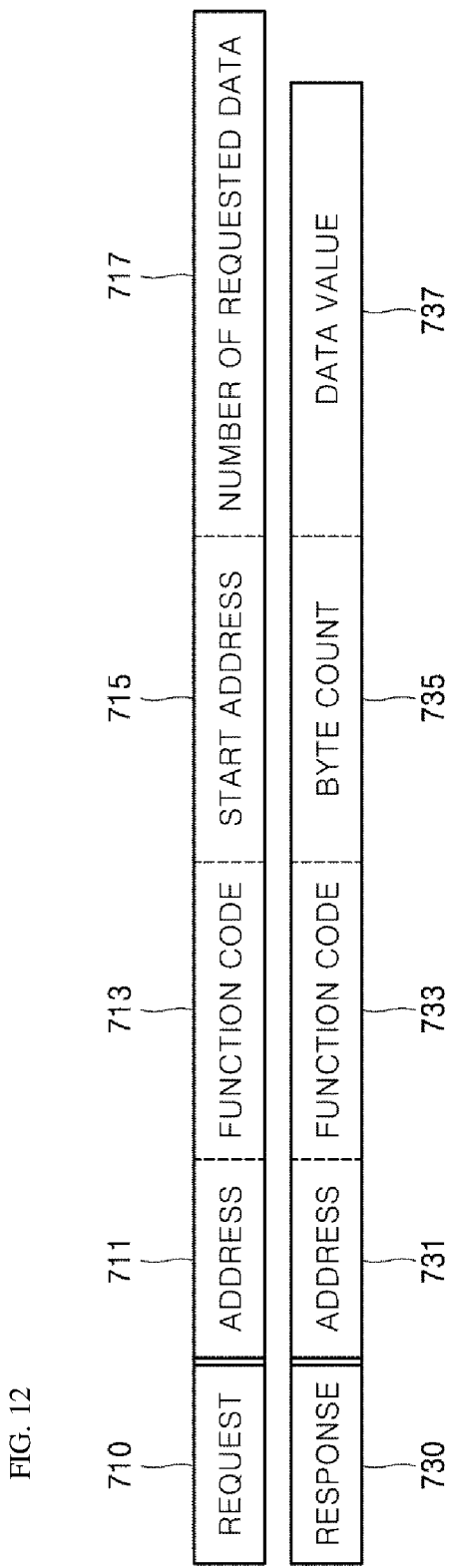
FIG. 12 is a diagram for describing a data request signal and a response signal according to some embodiments of the present invention.

FIG. 12 is a diagram for describing a data request signal and a response signal according to some embodiments of the present invention.

Referring to FIG. 12, a data request signal 710 according to some embodiments of the present invention may include an address 711, a function code 713, a start address 715, and the number of requested data 717.

The address 711 may include the communication address of the Modbus serial communication. The communication address may include communication addresses having natural numbers from 1 to 247. For example, a single communication address may be set to a single slave communication module 200. At this point, when the single slave communication module 200 is connected to the single communication address, the master communication module 100 may determine the communication as being established normally. That is, when two or more slave communication modules 200 are connected to the single communication address, the master communication module 100 may determine the communication as being established abnormally.

The function code 713 may include a Modbus function code contained in the communication protocol map. For example, the function code 713 may include "0x05" for turning on/off or initializing electric power equipment, "0x04" for reading a measured value of the electric power equipment, "0x03" for reading a setting value of the electric power equipment, or "0x06" for inputting a setting value to the electric power equipment.

The start address 715 may include an address for which requested data is located in the communication protocol map. For example, when the data request signal 710 requests model information of the electric power equipment, the model information of the electric power equipment may be located at an address "0x53" in the communication protocol map.

The number of requested data 717 may include the number of data requested by the data request signal 710. For example, when a current, a voltage, and a measured voltage value of the electric power equipment are requested, the data request signal 710 may request three pieces of data.

Further, the data request signal 710 may include a cyclic redundancy check (CRC) error check value.

Furthermore, a response signal 730 may include an address 731, a function code 733, a byte count 735, and a data value 737.

The address 731 may include a communication address set to the slave communication module 200. At this point, a single communication address may be set to a single slave communication module 200.

The function code 733 may include a Modbus function code contained in the communication protocol map. For example, the function code 733 may include "0x05" for turning on/off or initializing electric power equipment, "0x04" for reading a measured value of the electric power equipment, "0x03" for reading a setting value of the electric power equipment, or "0x06" for inputting a setting value to the electric power equipment.

The byte count 735 may include a total number of bytes of the response signal 730. For example, the master communication module 100 may determine whether the response signal 730 is a normal response using a length of the byte count 735.

The data value 737 may include a data value requested by the data request signal 710. For example, when the data request signal 710 requests model information of the electric power equipment, the slave communication module 200 may transmit the response signal 730 including the model information in the data value to the master communication module 100.

Further, the response signal 730 may include a CRC error check value. However, the present invention is not limited thereto.

Figure 13:
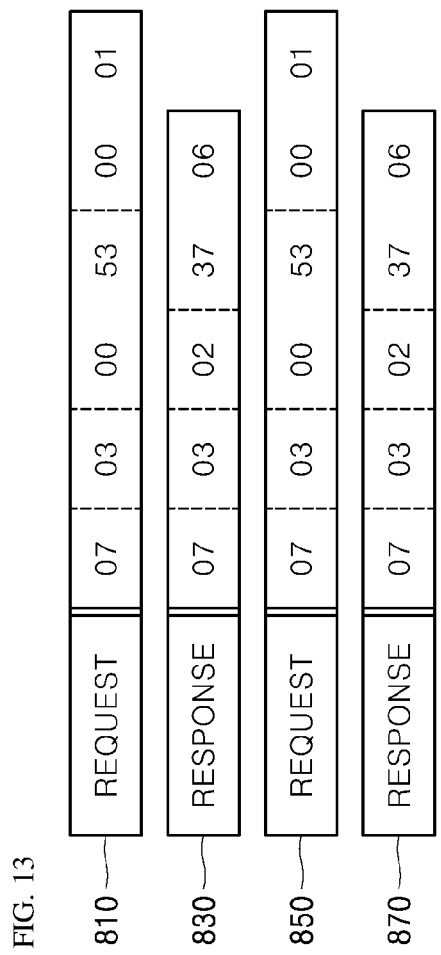
FIG. 13 is a diagram for describing a data request signal and a response signal according to one embodiment of the present invention.

FIG. 13 is a diagram for describing a data request signal and a response signal according to one embodiment of the present invention.

Referring to FIG. 13, the master communication module 100 may transmit a first data request signal 810 to the slave communication module 200 corresponding to a communication address "#7." For example, the first data request signal 810 may include a command for requesting "one piece of data" from a "0x53" th address of a function code "0x03" to the slave communication module 200 corresponding to the communication address "#7."

Further, the slave communication module 200 corresponding to the communication address "#7," which has received the first data request signal 810, may transmit a first response signal 830 to the master communication module 100. For example, the first response signal 830 may include a response representing that the slave communication module 200 corresponding to the communication address "#7" transmits a total of two bytes as a response with respect to the function code "0x03," and a transmitted value is "37 06."

When the first response signal 830 is determined as being a normal response, the master communication module 100 may transmit a second data request signal 850. The second data request signal 850 may be the same as the first data request signal 810.

When both the first response signal 830 and a second response signal 870 are determined as being normal responses, the master communication module 100 may determine that communication between the master communication module 100 and the slave communication module 200 having the #7 communication address is established normally. However, the present invention is not limited thereto.

Figure 14:
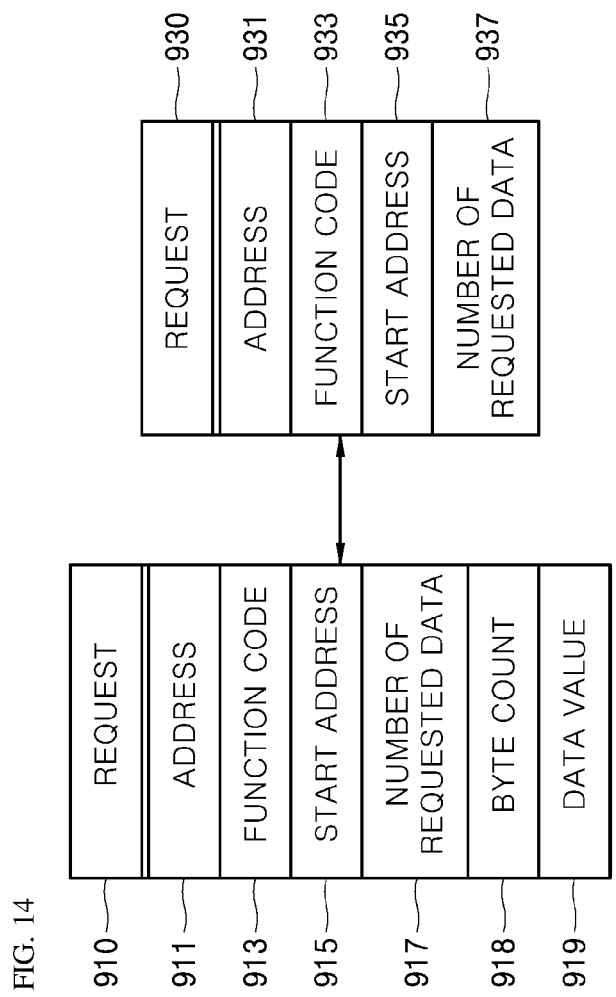
FIG. 14 is a diagram for describing a data request signal and a response signal according to another embodiment of the present invention.

FIG. 14 is a diagram for describing a data request signal and a response signal according to another embodiment of the present invention.

Referring to FIG. 14, a data request signal 910 according to one embodiment of the present invention may include an address 911, a function code 913, a start address 915, the number of addresses 917, a byte count 918, and a data value 919.

The address 911 may include the communication address of the Modbus serial communication. The communication address may include communication addresses having natural numbers from 1 to 247. For example, a single communication address may be set to a single slave communication module.

The function code 913 may include a Modbus function code contained in the communication protocol map. For example, the function code 913 may include "0x05" for turning on/off or initializing electric power equipment, "0x04" for reading a measured value of the electric power equipment, "0x03" for reading a setting value of the electric power equipment, or "0x06 or 0x10" for inputting a setting value to the electric power equipment.

When a setting value will be changed by the data request signal 910, the start address 915 may include an address for which a setting value which will be changed is located in the communication protocol map.

When the setting value will be changed by the data request signal 910, the number of addresses 917 may include the number of setting values which will be changed in the communication protocol map. For example, the number of addresses may include two addresses in which current and voltage setting values of the electric power equipment are changed.

When the setting value will be changed by the data request signal 910, the byte count 918 may include a total byte count value of the setting value.

When the setting value will be changed by the data request signal 910, the data value 919 may include setting value data which is actually changed.

A response signal 930 according to one embodiment of the present invention may include an address 931, a function code 933, a start address 935, and the number of addresses 937.

The address 931 may include a communication address set to the slave communication module 200. At this point, a single communication address may be set to a single slave communication module 200.

The function code 933 may include a Modbus function code contained in the communication protocol map. For example, the function code 933 may include "0x05" for turning on/off or initializing electric power equipment, "0x04" for reading a measured value of the electric power equipment, "0x03" for reading a setting value of the electric power equipment, or "0x06" for inputting a setting value to the electric power equipment.

When the setting value is changed, the start address 935 may include an address for which the changed setting value is located in the communication protocol map.

When the setting value is changed, the number of addresses 937 may include the number of setting values changed in the communication protocol map. However, the present invention is not limited thereto.

Figure 15:
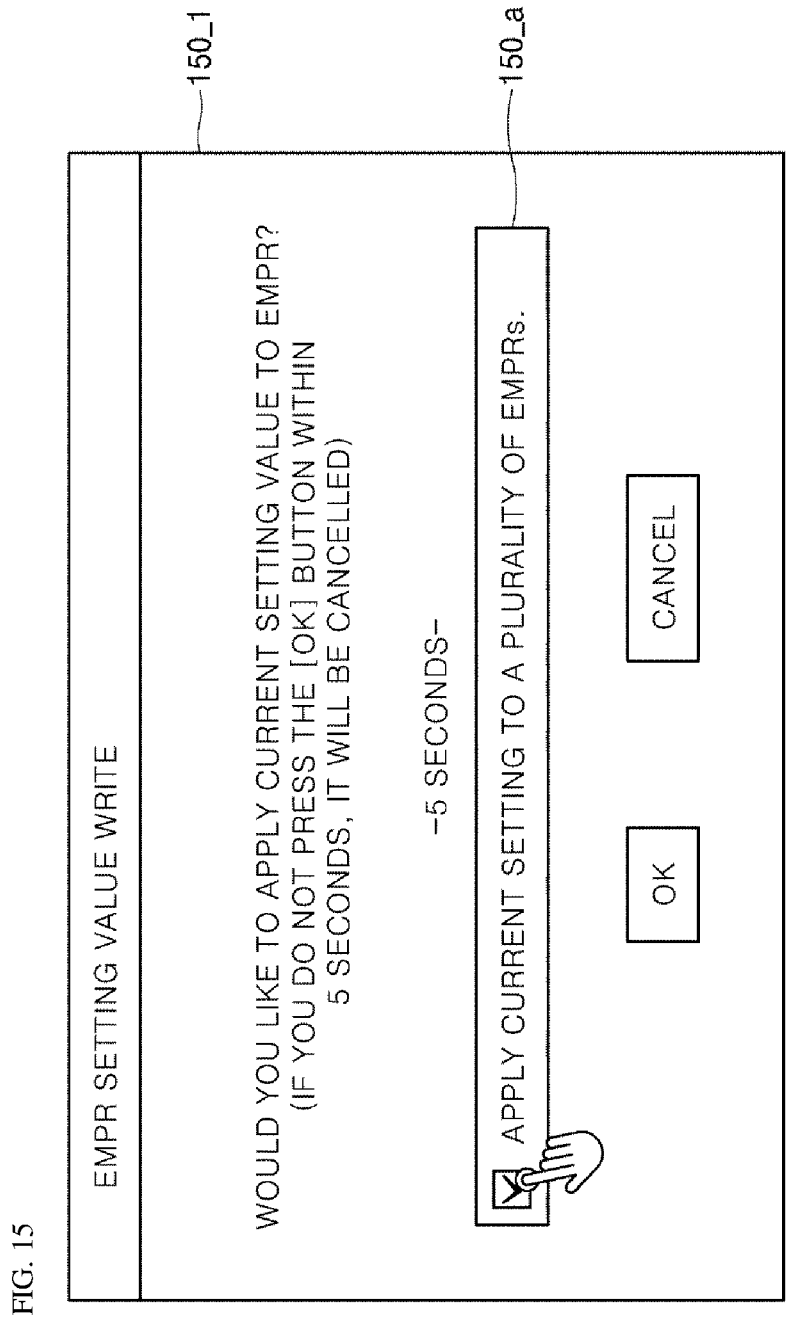
FIG. 15 is a diagram illustrating an electric power equipment setting value change screen according to some embodiments of the present invention.

FIG. 15 is a diagram illustrating an electric power equipment setting value change screen according to some embodiments of the present invention.

Referring to FIG. 15, the master communication module 100 may display an electric power equipment setting value change screen 150_1 on the display 150. For example, a user may input a setting value change menu of a slave communication module of which a setting value will be changed among slave communication modules 200 normally connected to communicate with the master communication module 100.

At this point, after changing the setting value of the slave communication module of which the setting value will be changed, the user inputs a menu 150_a to select a plurality of slave communication modules having the same type name as that of the slave communication module of which the setting value will be changed (e.g., the type name includes model information or unique identification information of a slave communication module).

Here, the slave communication module 200 may include electric power equipment (e.g., an EMPR) including a slave communication module. However, the present invention is not limited thereto.

Figure 16:
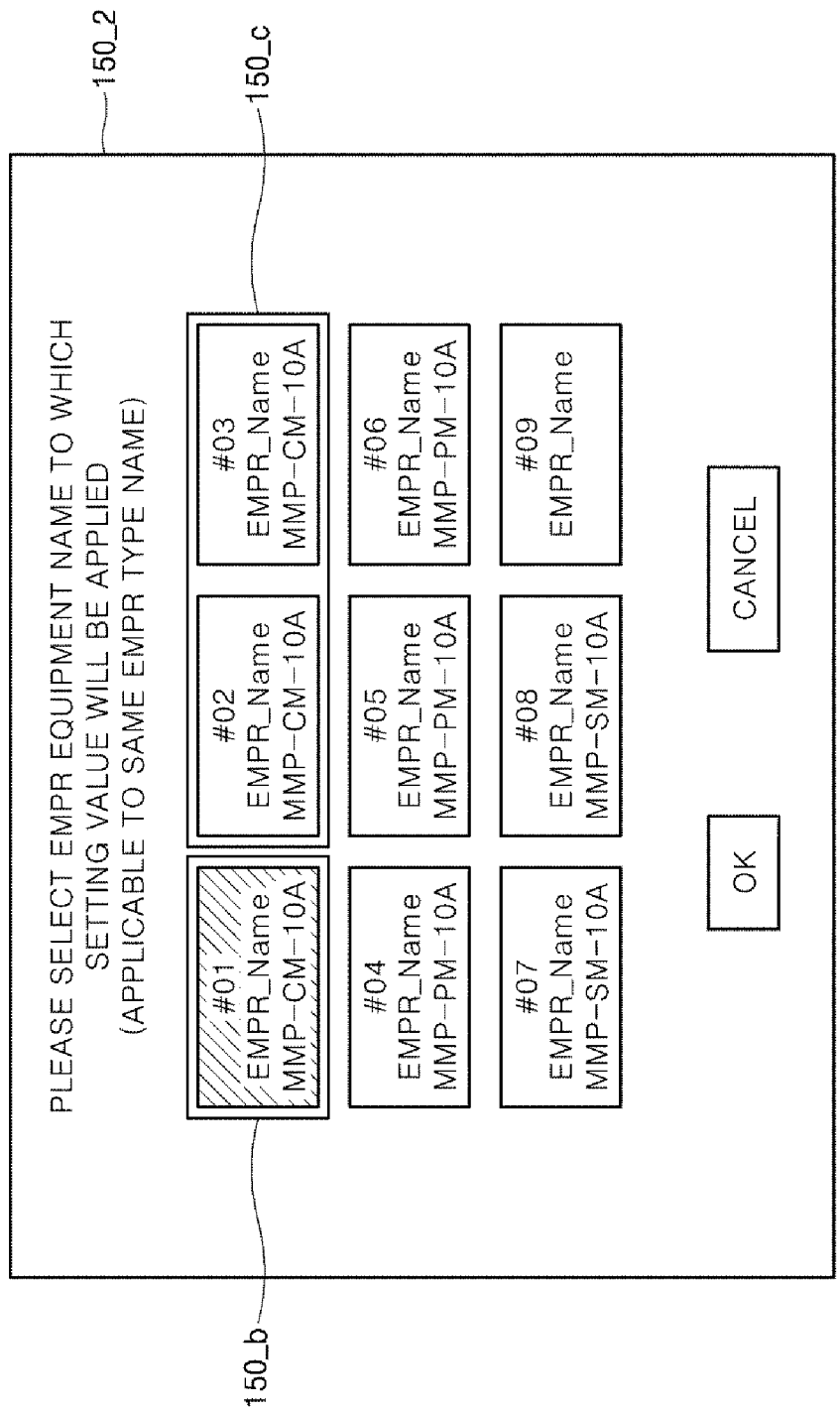
FIG. 16 is a diagram illustrating an electric power equipment setting value change screen according to one embodiment of the present invention.

FIG. 16 is a diagram illustrating an electric power equipment setting value change screen according to one embodiment of the present invention.

Referring to FIG. 16, the master communication module 100 may display an electric power equipment setting value change screen 150_2 on the display 150. For example, when the user changes a setting value of a slave communication module having a type name of "MMP-CM-10A," an icon 150_b corresponding to the slave communication module of which the setting value is changed may be displayed on the display 150 of the master communication module 100 as being distinguished from other icons.

At this point, one or more icons 150_c corresponding to the slave communication module having the same type name of "MMP-CM-10A" and of which the setting value is changed may be activated to be selectable.

The user may collectively change the same setting value with respect to a plurality of slave communication modules having the same type name of "MMP-CM-10A." At this point, the user may select an icon corresponding to a slave communication module of which a setting value is desired to be changed from among the activated icons 150_c. When the user selects the icon, the activated icons 150_c may be displayed as being selected by the user through a shade variation or a color variation.

Here, a method for the user to select an icon displayed on the display 150 may include a touch screen touch method or a mouse click method. However, the present invention is not limited thereto.

According to one embodiment of the present invention, when the user selects the icon 150_b, which corresponds to the slave communication module of which the setting value has been changed, for a predetermined time (e.g., a case of waiting for two seconds or more while pressing the icon 150_b with a finger), the icon 150_c corresponding to a slave communication module having the same type name (e.g., "MMP-CM-10A") as that of the slave communication module, of which the setting value has been changed, may be activated to be selectable.

For example, when the user selects icons of a plurality of slave communication modules of which setting values will be collectively changed and then selects an OK button, the same setting values of the plurality of slave communication modules may be collectively changed. However, the present invention is not limited thereto.

Figure 17:
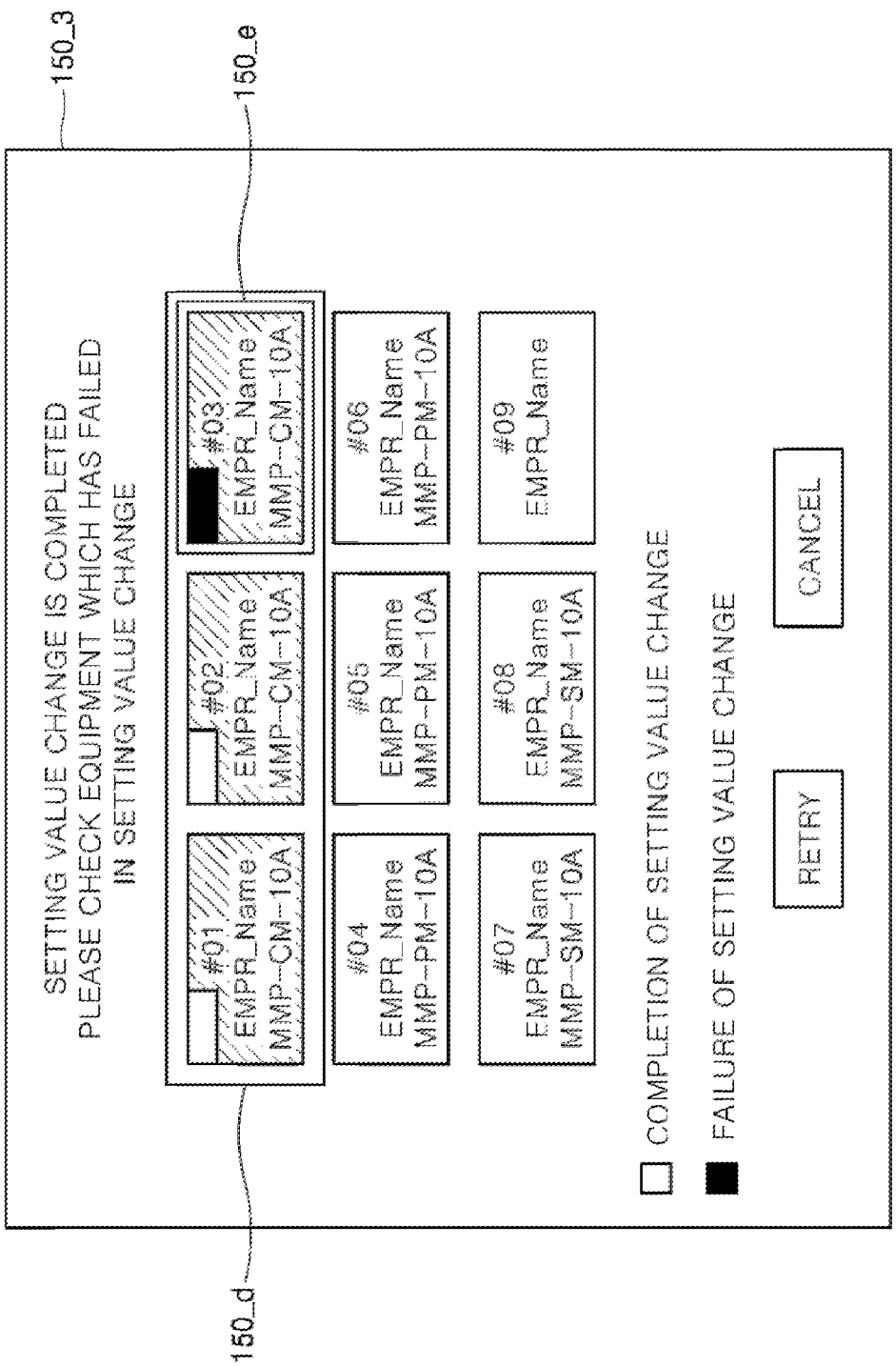
FIG. 17 is a diagram illustrating an electric power equipment setting value change screen according to another embodiment of the present invention.

FIG. 17 is a diagram illustrating an electric power equipment setting value change screen according to another embodiment of the present invention.

Referring to FIG. 17, the master communication module 100 may display an electric power equipment setting value change screen 150_3 on the display 150. For example, the master communication module 100 may display icons 150_d corresponding to the slave communication modules, in which a collective change has been attempted for the setting values, on the display 150 by discriminating from other icons. For example, the master communication module 100 may display the icons 150_d with different colors or shades.

For example, the master communication module 100 may discriminate and display an icon corresponding to the slave communication module of which the setting value has been changed from an icon 150_e corresponding to a slave communication module in which change of a setting value has failed. In this case, the master communication module 100 may display a setting value change completion icon in green and a setting value change failure icon in red. However, the present invention is not limited thereto.

According to the above-described present invention, setting values of a plurality of electric power equipment are easily and collectively changed in the master communication module configured to manage the plurality of electric power equipment, and thus there is an advantage in that a time required for changing the setting values can be reduced and work efficiency of an industrial field can be improved.

Further, according to the present invention, electric power equipment having the same type name as that of target electric power equipment of which a setting value will be changed is discriminated and displayed from other electric power equipment, and thus there is an advantage in that user convenience can be improved.

Furthermore, according to the present invention, communication of the electric power equipment is automatically established without a direct input of a communication address by the user, and thus there is an advantage in that time and costs can be saved.

Figure 18:
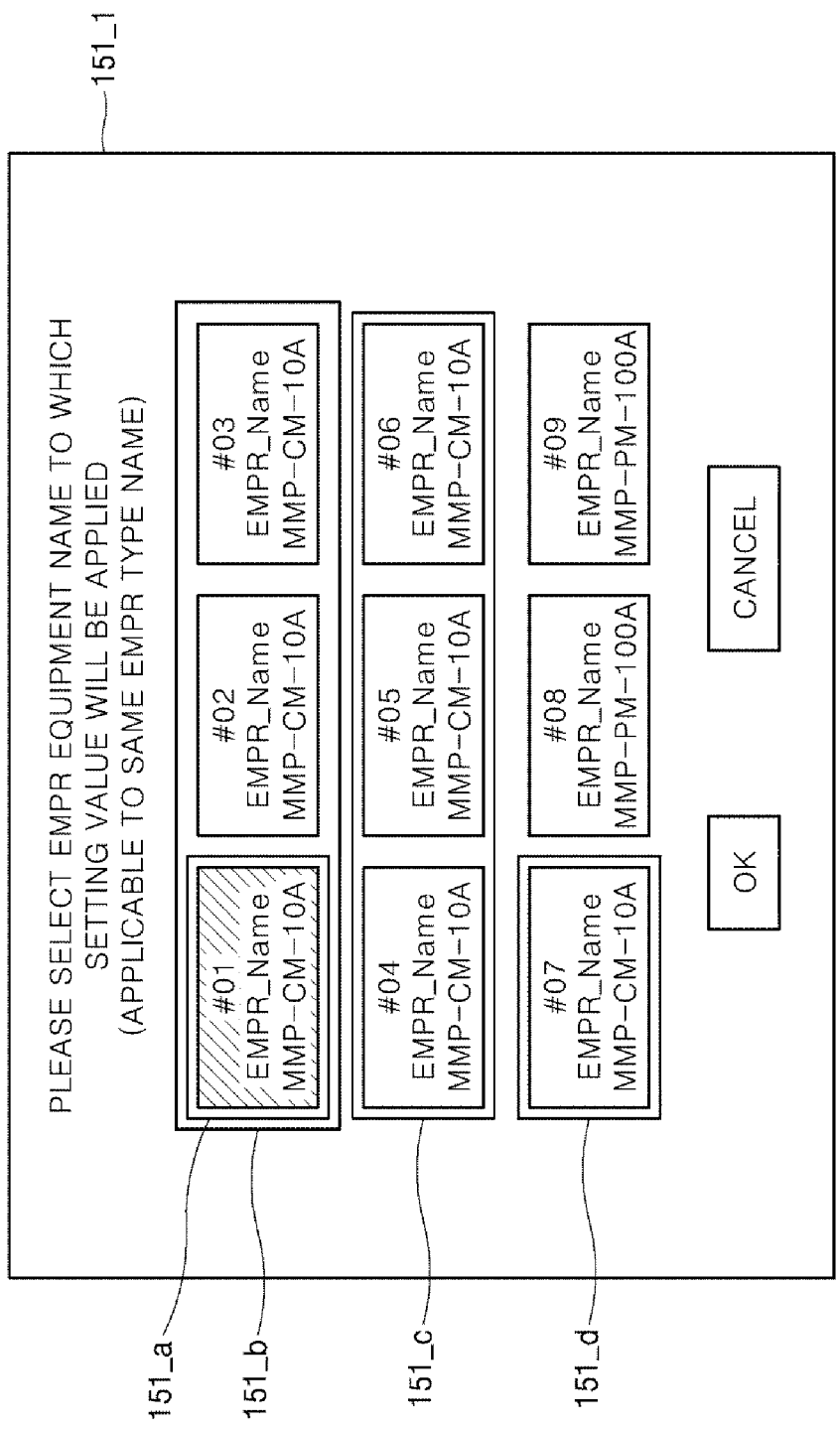
FIG. 18 is a diagram illustrating a screen displaying icons corresponding to electric power equipment according to still another embodiment of the present invention.

FIG. 18 is a diagram illustrating a screen displaying icons corresponding to electric power equipment according to still another embodiment of the present invention.

Referring to FIG. 18, the master communication module 100 may display a screen 151_1 with icons corresponding to a plurality of electric power equipment on the display 150.

For example, when the user intends to change a setting value of a slave communication module having a type name of "MMP-CM-10A" and a communication address #1, the master communication module 100 may discriminate and display an icon 151_a corresponding to the slave communication module having the communication address #1 from other icons. At this point, a discrimination method may include a method of making colors or shades of the icons different from each other.

For example, when the user intends to change the setting value of the slave communication module having the type name of "MMP-CM-10A" and the communication address #1, the master communication module 100 may discriminate and display an icon of a slave communication module having the same type name as "MMP-CM-10A" of the slave communication module having the communication address #1 from other icons.

Further, the master communication module 100 may group and display a plurality of slave communication modules having the same setting value and the same type name as "MMP-CM-10A" of the slave communication module having the communication address #1. For example, when a group 151_b of slave communication modules having communication addresses #1, #2, and #3 has the same setting value, a group 151_c of slave communication modules having communication addresses #4, #5, and #6 has the same setting value, and a setting value of a group 151_d of the slave communication module having the communication address #7 is different from the setting values of the slave communication modules having the communication addresses #1 to #6, icons may be discriminated and displayed according to the slave communication modules having the same setting value. However, the present invention is not limited thereto.

Figure 19:
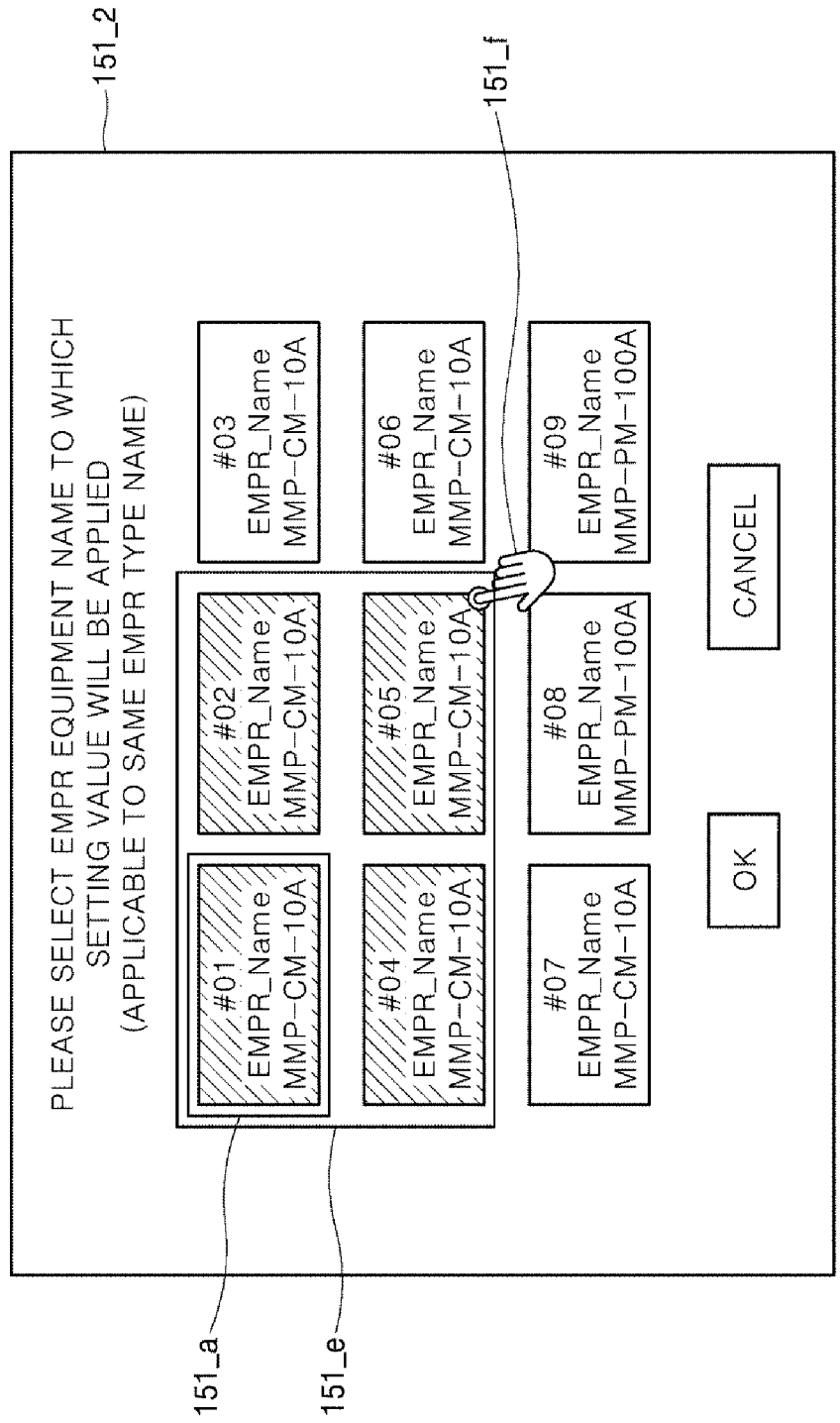
FIG. 19 is a diagram illustrating a screen displaying icons corresponding to electric power equipment according to yet another embodiment of the present invention.

FIG. 19 is a diagram illustrating a screen displaying icons corresponding to electric power equipment according to yet another embodiment of the present invention.

Referring to FIG. 19, the master communication module 100 may display a screen 151_2 with icons corresponding to a plurality of electric power equipment on the display 150.

For example, when the user intends to apply the setting value of the slave communication module having the type name of "MMP-CM-10A" and the communication address #1 to other slave communication modules, the master communication module 100 may discriminate and display the icon 151_a corresponding to the slave communication module having the communication address #1 from other icons. At this point, the user may control a cursor 151_f for clicking an icon by touching the display 150 or by using a mouse or a keyboard.

For example, when the user intends to apply the setting value of the slave communication module having the communication address #1 to the slave communication modules having the communication addresses #2, #4, and #5, the master communication module 100 may discriminate and display icons 151_e corresponding to the communication addresses # 1, # 2, # 4, and # 5 from other icons. However, the present invention is not limited thereto.

In accordance with the above-described present invention described above, a plurality of electric power equipment having the same type name or the same setting value are displayed to be easily identified so as to allow electric power equipment of which a setting value will be changed to be selectable, and thus there is an advantage in that convenience in a change of the setting value can be improved.

Further, in accordance with the present invention, setting values of a plurality of electric power equipment are easily and collectively changed in the master communication module configured to manage the plurality of electric power equipment, and thus there is an advantage in that a time required for changing the setting values can be reduced and work efficiency in an industrial field can be improved.

Furthermore, in accordance with the present invention, electric power equipment having the same type name as that of target electric power equipment of which a setting value will be changed is discriminated and displayed from other electric power equipment, and thus there is an advantage in that user convenience can be improved.

In addition, in accordance with the present invention, communication of the electric power equipment is automatically established without a direct input of a communication address by the user, and thus there is an advantage in that time and costs can be saved.

While the embodiments of the present invention have been described with reference to the accompanying drawings, those skilled in the art will understand that the present invention can be implemented in other specific forms without departing from the technical spirit or the necessary features of the present invention. Therefore, it should be understood that the above-described embodiments are not restrictive but illustrative in all aspects.

What is claimed is:

1. A method for changing a setting value of electric power equipment, which is performed in a master communication module connected to a plurality of slave communication modules through a serial communication network, the method comprising:

transmitting a data request signal including a predetermined communication address and receiving a response signal corresponding to the data request signal from a slave communication module corresponding to the communication address using the serial communication network;

determining whether communication between the master communication module and the slave communication module is established normally on the basis of the data request signal and the response signal;

receiving, from the response signal, model information of a slave communication module in which a setting value change event occurs from among slave communication modules of which communications are established normally; and discriminating and displaying, among the slave communication modules of which the communications are established normally, a slave communication module, which has the same model information as the model information of the slave communication module in which the setting value change event occurs, from a slave communication module having model information different from the model information.

2. The method of claim 1, wherein the discriminating and displaying of the slave communication module includes discriminating and displaying an icon corresponding to the slave communication module, which has the same model information as the model information of the slave communication module in which the setting value change event occurs, from an icon corresponding to a slave communication module having model information different from the model information of the slave communication module in which the setting value change event occurs.

3. The method of claim 2, further comprising activating, when an activation condition in which a setting value is variable is satisfied, the icon corresponding to the slave communication module having the same model information as the model information of the slave communication module in which the setting value change event occurs so as to allow icon selection.

4. The method of claim 3, wherein the activation condition includes a change of the setting value of the slave communication module in which the setting value change event occurs.

5. The method of claim 3, wherein the activation condition includes selection by a user of an icon corresponding to the slave communication module in which the setting value change event occurs for a predetermined period of time.

6. The method of claim 2, wherein the discriminating and displaying of the slave communication module includes discriminating and displaying a first icon selected by a user from among icons corresponding to slave communication modules, which have the same model information as the model information of the slave communication module in which the setting value change event occurs, from a second icon different from the first icon.

7. The method of claim 1, further comprising changing the setting value of the slave communication module, which has the same model information as the model information of the slave communication module in which the setting value change event occurs, to be the same as the setting value of the slave communication module in which the setting value changing event occurs.

8. The method of claim 7, wherein the changing of the setting value of the slave communication module, which has the same model information as the model information of the slave communication module in which the setting value change event occurs to be the same as the setting value of the slave communication module in which the setting value changing event occurs, includes changing a setting value of a slave communication module corresponding to the icon selected by the user from among the icons corresponding to the slave communication modules, which have the same model information as the model information of the slave communication module in which the value change event occurs, to be the same as the setting value of the slave communication module in which the setting value changing event occurs.

9. The method of claim 7, wherein the setting value change event occurs when a setting value change menu of the slave communication module is input to the master communication module or when the setting value of the slave communication module is changed.

10. The method of claim 1, wherein the determining of whether the communication is established normally includes receiving model information and a setting value of the slave communication module of which the communication is established normally.

11. A method for changing a setting value of electric power equipment, which is performed in a master communication module connected to a plurality of slave communication modules through a serial communication network, the method comprising:
   transmitting a data request signal including a predetermined communication address and receiving a response signal corresponding to the data request signal from a slave communication module corresponding to the communication address using the serial communication network;
   determining whether communication between the master communication module and the slave communication module is established normally on the basis of the data request signal and the response signal;
   receiving model information and a setting value of a slave communication module in which a setting value change event occurs among one or more slave communication modules of which communications are established normally; and
   discriminating and displaying the slave communication module in which the setting value change event occurs among the one or more slave communication modules from other communication modules on the basis of the model information and the setting value.

12. The method of claim 11, wherein the discriminating ang displaying of the slave communication module in which the setting value change event occurs from other communication modules includes discriminating a slave communication module, which has the same model information as the model information of the slave communication module in which the setting value change event occurs, among the one or more slave communication modules from the other slave communication modules.

13. The method of claim 12, wherein the discriminating and displaying of the slave communication module in which the setting value change event occurs from other communication modules includes discriminating a slave communication module, which has a setting value the same as the setting value of the slave communication module in which the setting value change event occurs, from other slave communication modules among slave communication modules having model information the same as the model information of the slave communication module in which the setting value change event occurs.

14. The method of claim 13, further comprising changing the setting value, which is the same as the setting value of the slave communication module in which the setting value change event occurs, of the slave communication module to a setting value input by the user.

15. The method of claim 12, wherein the discriminating and displaying of the slave communication module in which the setting value change event occurs from other communication modules includes discriminating a slave communication module, which has a setting value different from the setting value of the slave communication module in which the setting value change event occurs, from other slave communication modules among slave communication modules having model information the same as the model information of the slave communication module in which the setting value change event occurs.

16. The method of claim 15, wherein the discriminating and displaying of the slave communication module in which the setting value change event occurs from the other communication modules includes grouping and displaying slave communication modules, which have the same setting value among the slave communication modules having setting values different from the setting value of the slave communication module in which the setting value change event occurs.

17. The method of claim 15, further comprising changing the setting value of the slave communication module, which has the setting value different from the setting value of the slave communication module in which the setting value change event occurs, to be the same as the setting value of the slave communication module in which the setting value changing event occurs.

18. A device for changing a setting value of electric power equipment, the device comprising:
- a plurality of slave communication modules interconnected by a serial communication network; and
- a master communication module configured to exchange data with the plurality of slave communication modules through the serial communication network, wherein the master communication module includes:
- a communication part configured to, using the serial communication network, transmit a data request signal including a predetermined communication address and receive a response signal corresponding to the data request signal from a slave communication module corresponding to the communication address;
- a controller configured to determine whether communication between the master communication module and the plurality of slave communication modules is established normally on the basis of the data request signal and the response signal, and extract, from the response signal, model information of a slave communication module in which a setting value change event occurs among the slave communication modules of which the communications are established normally; and
- a display for discriminating and displaying, among the slave communication modules of which the communications are established normally, a slave communication module having the same model information as the model information of the slave communication module in which the setting value change event occurs from a slave communication module having model information different from the model information.

19. The device of claim 18, wherein the display discriminates and displays an icon corresponding to the slave communication module having the same model information as the model information of the slave communication module in which the setting value change event occurs from an icon corresponding to a slave communication module having model information different from the model information of the slave communication module in which the setting value change event occurs.

* * * * *